United States Patent
Kojima

(10) Patent No.: US 9,462,530 B2
(45) Date of Patent: Oct. 4, 2016

(54) WIRELESS BASE STATION, WIRELESS TERMINAL, AND PACKET TRANSMISSION METHOD

(71) Applicant: FUJITSU LIMITED, Kawasaki-shi, Kanagawa (JP)

(72) Inventor: Yuji Kojima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 213 days.

(21) Appl. No.: 13/909,703

(22) Filed: Jun. 4, 2013

(65) Prior Publication Data

US 2014/0071971 A1 Mar. 13, 2014

(30) Foreign Application Priority Data

Sep. 10, 2012 (JP) ................................. 2012-198950

(51) Int. Cl.
| | |
|---|---|
| *H04L 12/24* | (2006.01) |
| *H04W 40/02* | (2009.01) |
| *H04W 28/02* | (2009.01) |
| *H04L 12/805* | (2013.01) |

(52) U.S. Cl.
CPC .............. *H04W 40/02* (2013.01); *H04L 47/36* (2013.01); *H04W 28/0205* (2013.01)

(58) Field of Classification Search
None
See application file for complete search history.

(56) References Cited

U.S. PATENT DOCUMENTS

| 7,996,894 | B1* | 8/2011 | Chen et al. ...................... 726/22 |
|---|---|---|---|
| 2003/0210673 | A1 | 11/2003 | Nishimura |
| 2005/0124340 | A1* | 6/2005 | Giesberts et al. .......... 455/432.1 |
| 2005/0152358 | A1 | 7/2005 | Giesberts et al. |
| 2006/0104303 | A1* | 5/2006 | Makineni et al. ............. 370/463 |
| 2006/0114872 | A1* | 6/2006 | Hamada ......................... 370/338 |
| 2006/0133379 | A1* | 6/2006 | Krishnan et al. ............. 370/394 |
| 2009/0154496 | A1* | 6/2009 | Fujinami ............... H04W 80/02 370/469 |
| 2009/0176487 | A1* | 7/2009 | DeMarco ............. H04B 7/2606 455/422.1 |
| 2009/0285192 | A1* | 11/2009 | Shiba ..................... H04W 80/02 370/338 |
| 2010/0296388 | A1* | 11/2010 | Shimizu et al. ............... 370/216 |
| 2011/0122803 | A1* | 5/2011 | Ahn ............................... 370/311 |
| 2012/0155518 | A1* | 6/2012 | Nakamura et al. ........... 375/219 |
| 2012/0294226 | A1* | 11/2012 | Racz et al. ..................... 370/315 |

(Continued)

FOREIGN PATENT DOCUMENTS

| JP | 2002-009832 | 1/2002 |
|---|---|---|
| JP | 2003-324445 | 11/2003 |

(Continued)

OTHER PUBLICATIONS

Japanese Patent Office Action dated Jun. 28, 2016 for corresponding Japanese Patent Application No. 2012-198950.

*Primary Examiner* — Fang Ng
(74) *Attorney, Agent, or Firm* — Staas & Halsey LLP

(57) ABSTRACT

A wireless base station includes a processor configured to detect whether a device that is a final destination of packets is a wireless device or a wired device, aggregate payloads in unit of byte, which are included in the packets comply with a TCP, so as to become a maximum length of data unit which is allowed for the data link layer in an wireless LAN, when a condition is satisfied in which the device is detected to be the wireless device, form a payload complying with a protocol of the data link layer in a wireless network based on the aggregated payloads when the condition is satisfied, and configure a packet that includes the formed payload complying with the protocol when the condition is satisfied and configure packets that include the payloads complying with the TCP when the condition is not satisfied.

14 Claims, 31 Drawing Sheets

(56) References Cited

U.S. PATENT DOCUMENTS

2013/0250796 A1\* 9/2013 Frankkila et al. ............ 370/252
2014/0044111 A1\* 2/2014 Nuti ........................ H04L 45/40
370/338

FOREIGN PATENT DOCUMENTS

| | | |
|---|---|---|
| JP | 2005-184839 | 7/2005 |
| JP | 2005-311910 | 11/2005 |

\* cited by examiner

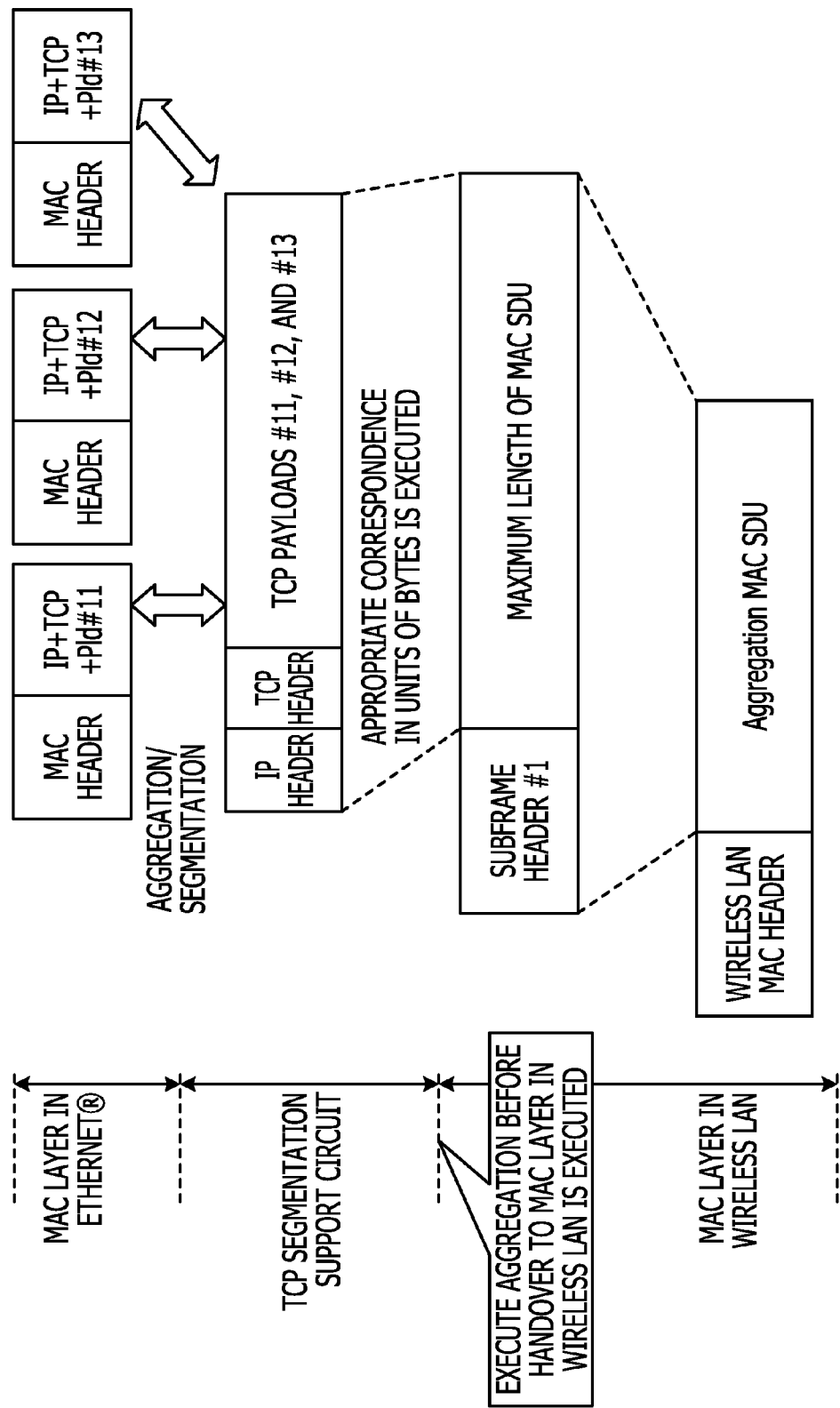

| FIG. 13A | DESTINATION MAC=TERMINAL | DESTINATION IP=TERMINAL | PAYLOAD |
|---|---|---|---|

| FIG. 13B | DESTINATION MAC=COMMUNICATION DEVICE OF RELAY DESTINATION | DESTINATION IP=COMMUNICATION DEVICE OF RELAY DESTINATION | PAYLOAD |
|---|---|---|---|

| FIG. 13C | DESTINATION MAC=RELAY DEVICE | DESTINATION IP=COMMUNICATION DEVICE OF RELAY DESTINATION | PAYLOAD |
|---|---|---|---|

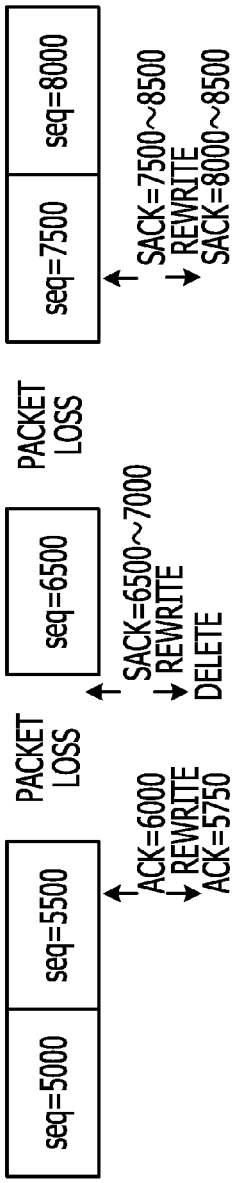
FIG. 23A
FIG. 23B
FIG. 23C
FIG. 23D
FIG. 23E
FIG. 23F
FIG. 23G

WIRELESS BASE STATION, WIRELESS TERMINAL, AND PACKET TRANSMISSION METHOD

CROSS-REFERENCE TO RELATED APPLICATION

This application is based upon and claims the benefit of priority from the prior Japanese Patent Application No. 2012-198950 filed on Sep. 10, 2012, the entire contents of which are incorporated herein by reference.

FIELD

The embodiments discussed herein are related to a wireless base station, a wireless terminal, and a packet transmission method.

BACKGROUND

Currently, in a communication system, a wired network and a wireless network are mixed. FIG. 1 is a diagram illustrating an example of a communication system. A wireless local area network (LAN) terminal performs, for example, packet communication with a communicating party through a wireless link between the wireless LAN terminal and a wireless LAN base station (that is, access point: AP) and through a wired link between the wireless LAN base station and the communicating party (see FIG. 1). The wired link is, for example, the Ethernet (registered trademark).

In addition, as illustrated in FIG. 1, in the communication system, there exists a relay device. The relay device is connected to the wireless LAN base station through the wireless link, and connected to a relay destination device through the wired link. That is, the relay device connects the wireless LAN and the wired LAN.

Here, an allowable range of a payload length in the Ethernet® (hereinafter simply referred to as an "allowable range") is 46 to 1500 bytes. FIG. 2 is a diagram illustrating a format of a MAC frame in the Ethernet®. The payload length is a length of a portion except for a media access control (MAC) header. On the other hand, the maximum value of the allowable range in 802.11b/a/g of the Institute of Electrical and Electronics Engineers, Inc. (IEEE) that is standard of a wireless LAN is 2304 bytes. That is, in the communication system, networks having different allowable ranges are mixed.

In order to avoid inconvenience due to such mixed networks having different allowable ranges in the communication system, a packet having a payload length that corresponds to the smallest allowable range in the plurality of allowable ranges is transmitted. That is, in the wireless LAN of the communication system, a MAC service data unit (SDU) is configured by the payload length of the allowable range of the Ethernet®, and a MAC frame of the wireless LAN is configured in units of the MAC SDU. FIG. 3 is a diagram used to explain a relationship between a configuration of a MAC frame in a wired LAN and a configuration of a MAC frame in a wireless LAN.

In addition, in IEEE802.11n that is current standard of a wireless LAN, a scheme that is called "aggregation" has been introduced. In such a scheme, an aggregation MAC SDU is formed by aggregating a plurality of MAC SDU, and the formed aggregation MAC SDU is transmitted by a single MAC frame. FIG. 4 is a diagram used to explain such aggregation. By using such aggregation, transmission efficiency of the wireless LAN may be improved as compared with IEEE802.11b/a/g. Here, the maximum value of an "allowable range" corresponds to the maximum length of a MAC SDU.

Japanese Laid-open Patent Publication No. 2003-324445 and Japanese Laid-open Patent Publication No. 2005-184839 are examples of the related art.

SUMMARY

According to an aspect of the invention, a wireless base station includes a receiver that receives a plurality of packets, which comply with a transmission control protocol of a transport layer, through a wired network, a processor configured to detect whether a first communication device that is a final destination of the plurality of packets is any one of a wireless communication device and a wired communication device, aggregate payloads in unit of byte, which are included in the plurality of packets, so as to become a maximum length of data unit which is allowed for the data link layer in an wireless local area network, when a first condition is satisfied in which the first communication device is detected to be the wireless communication device, form a payload complying with a protocol of the data link layer in a wireless network based on the aggregated payloads when the first condition is satisfied, and configure a packet that includes the formed payload complying with the protocol of the data link layer when the first condition is satisfied and configure a plurality of packets that include the payloads complying with the transmission control protocol of the transport layer when the first condition is not satisfied, and a first transmitter that transmits the configured packet to a second communication device next to the wireless base station through the wireless network in a communication path between the wireless base station and the first communication device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 is a diagram schematically illustrating aggregation processing and segmentation processing in a case of IEEE802.11n;

FIGS. 13A to 13C are diagrams used to explain detection processing in a detection unit;

FIGS. 23A to 23G are diagrams used to explain the processing operations of the communication device, the base station, and the terminal in the uplink flow;

DESCRIPTION OF EMBODIMENTS

In the study of the inventors, in the above-described communication system, packets are transmitted using a payload length that corresponds to an allowable range in the wired LAN, which has the maximum value that is smaller than that of an allowable range in the wireless LAN. Therefore, the number of packets that is desired for a data amount to be transmitted increases, and a gap between the packets increases. That is, an overhead increases. Even when the aggregation is used, data may not be stored to such an extent that the data correspond to the maximum value of an aggregation MAC SDU, so that it is highly probable that such an overhead occurs.

Figure 5:
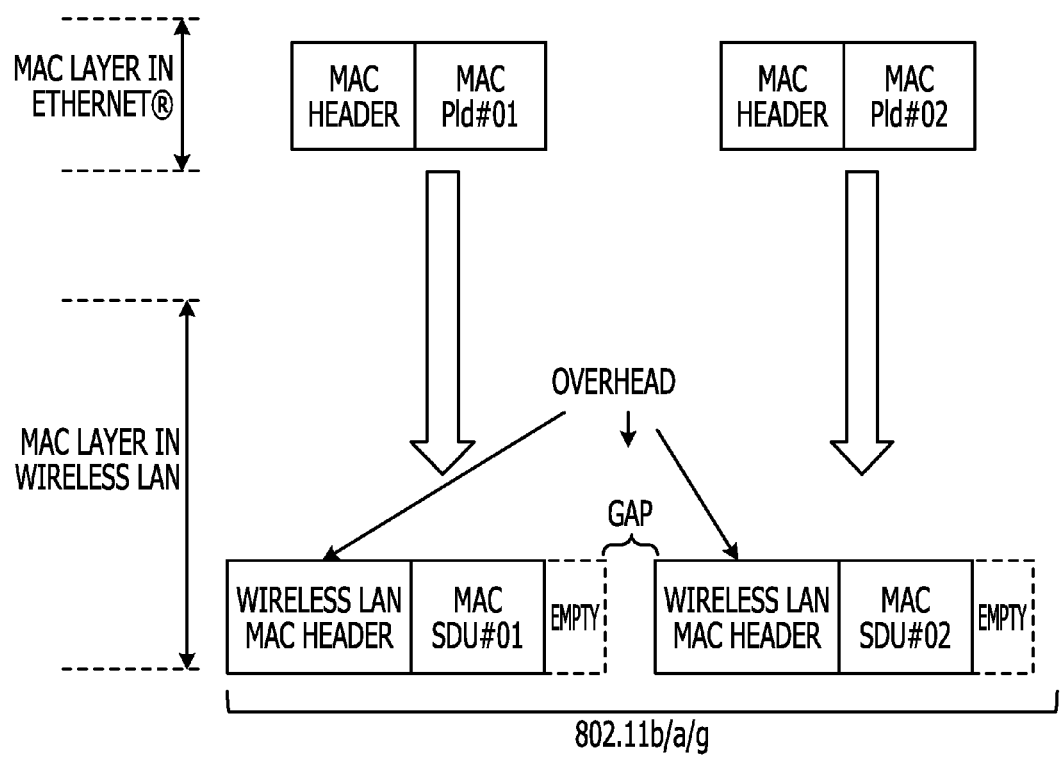
FIG. 5 is a diagram used to explain an overhead in IEEE802.11b/a/g.
Figure 6:
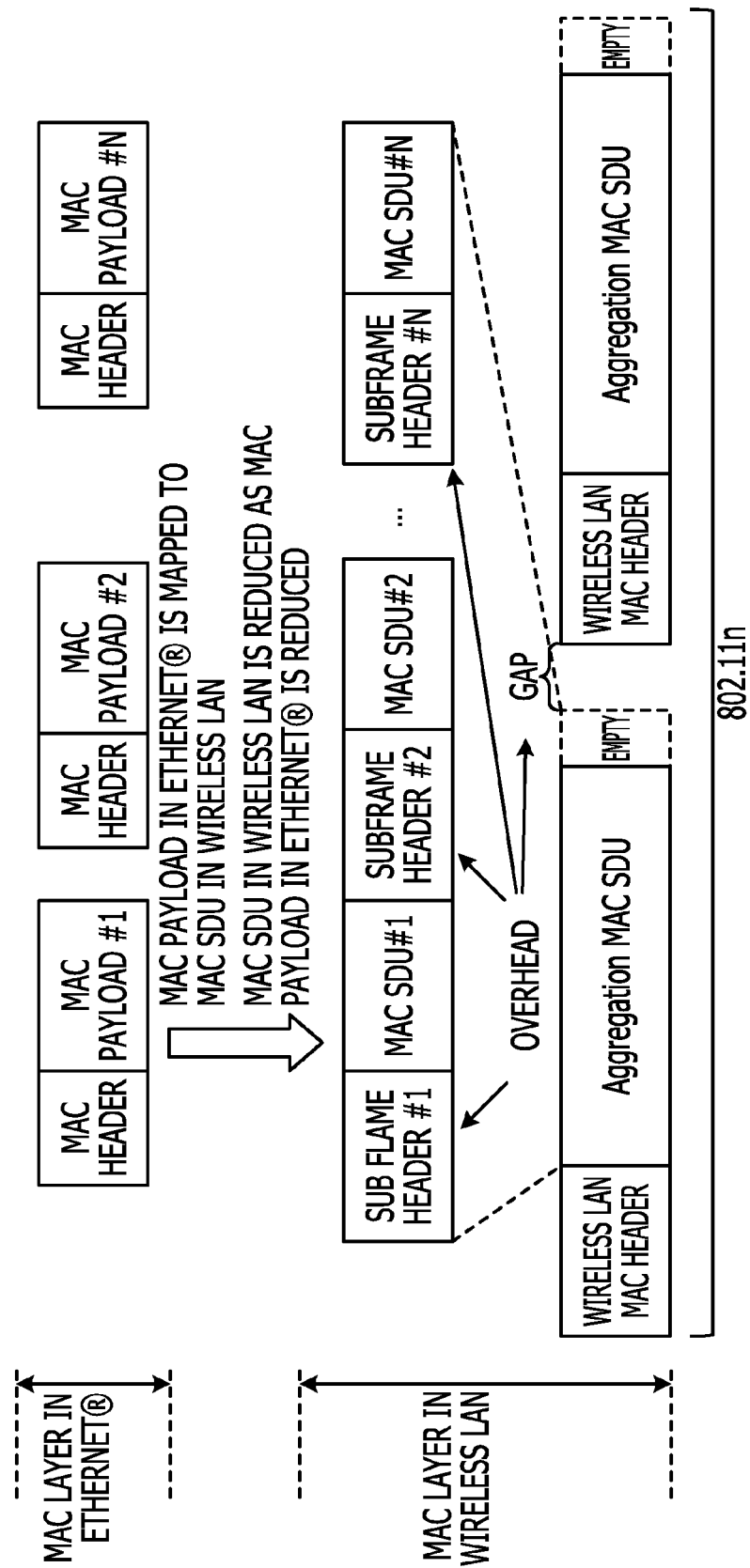
FIG. 6 is a diagram used to explain an overhead in IEEE802.11n.

In addition, regardless of whether the aggregation is used, a header is attached to a packet for each MAC SDU, so that an overhead increases undesirably. FIG. 5 is a diagram used to explain an overhead in IEEE802.11b/a/g. FIG. 6 is a diagram used to explain an overhead in IEEE802.11n.

In addition, in order to improve the transmission efficiency, it is conceivable that a packet the payload length of which is simply increased in accordance with the allowable range in the wireless LAN, which is larger than that of the allowable range in the wired LAN is transmitted. However, the processing load in the relay device increases because redistribution of the payload is performed in order to shorten the payload length in the relay device, so that the whole processing load in the communication system increases undesirably.

In the embodiments that are described later, the transmission efficiency may be improved.

The wireless LAN base station, the wireless LAN terminal, and the packet transmission method according to the embodiments discussed herein are described in detail below with reference to the accompanying drawings. The wireless LAN base station, the wireless LAN terminal, and the packet transmission method are not limited to such embodiments. In addition, in the embodiments, the same symbols are assigned to configuration elements having the same function, and a duplicate description is omitted.

First Embodiment

[Overview of a Communication System]

Figure 7:
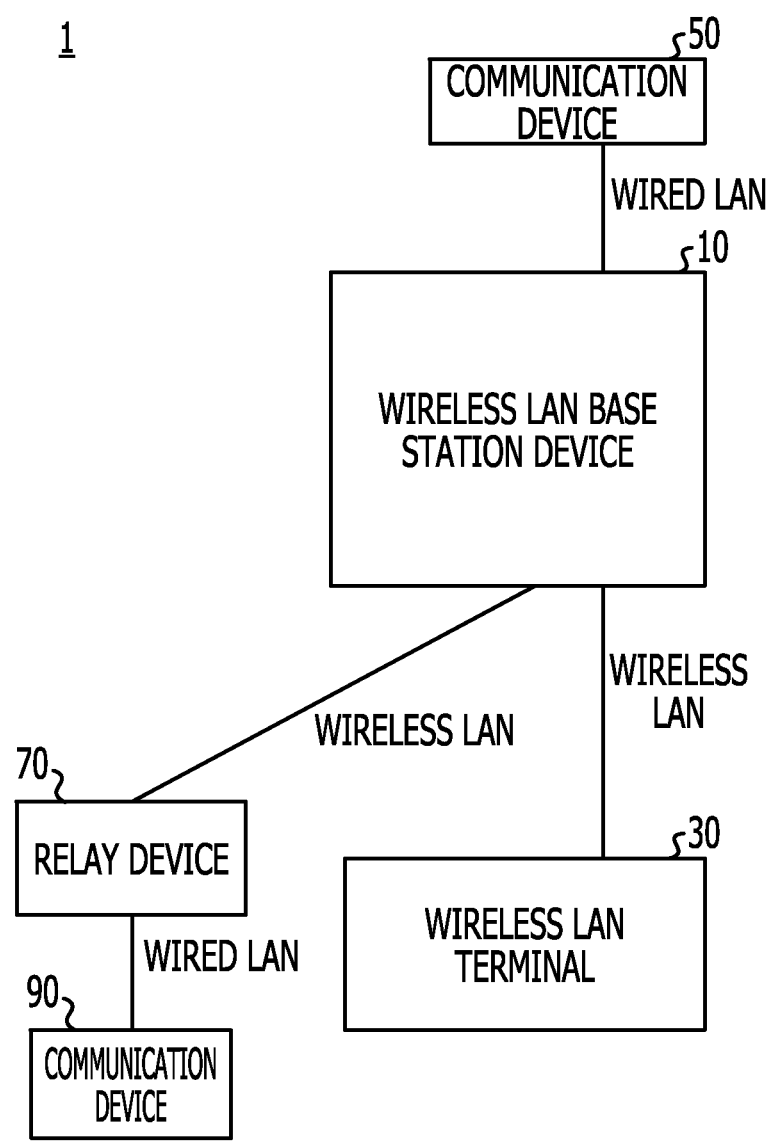
FIG. 7 is a diagram illustrating an example of a communication system according to a first embodiment.

FIG. 7 is a diagram illustrating an example of a communication system according to a first embodiment. In FIG. 7, a communication system 1 includes a wireless LAN base station 10, a wireless LAN terminal 30, communication devices 50 and 90, and a relay device 70. The wireless LAN base station and wireless LAN terminal may be simply referred to as a "base station" and a "terminal", respectively.

As illustrated in FIG. 7, the communication device 50 and the base station 10 are connected to each other through a wired LAN. In addition, the relay device 70 and the communication device 90 are connected to each other through the wired LAN. The wired LAN is, for example, the Ethernet®. In addition, the base station 10 and the terminal 30 are connected to each other through a wireless LAN. In addition, the base station 10 and the relay device 70 are connected to each other through the wireless LAN.

The base station 10 receives a plurality of packets from the communication device 50 through the wired LAN.

In addition, the base station 10 detects a type of a communication device that is a final destination of the plurality of received packets (hereinafter may be referred to as a "final destination device"). That is, the base station 10 detects whether the final destination device is a "first type communication device" for a wireless LAN, or a "second type communication device" for a wired LAN. The base station 10 detects that the final destination device is the first type communication device when the final destination device is the terminal 30, and the base station 10 detects that the final destination device is the second type communication device when the final destination device is the communication device 90.

In addition, when the final destination device is the first type communication device, the base station 10 forms a payload of a MAC layer corresponding to a data link layer by aggregating payloads of a transmission control protocol (TCP) layer corresponding to a transport layer, which are included in the plurality of received packets. Hereinafter, the payload of the TCP layer and the payload of the MAC layer may be simply referred to as a "TCP payload" and a "MAC payload", respectively. The aggregation of the TCP payloads is performed in units of bytes until the MAC payload reaches the maximum length of a MAC SDU which is allowed in the wireless LAN. In addition, the base station 10 configures a packet that includes the formed MAC payload.

On the other hand, when the final destination device is the second type communication device, the base station 10 configures a plurality of packets that individually include the MAC payloads of the plurality of received packets.

In addition, the base station 10 transmits the configured packets to a communication device next to the base station on a route between the base station 10 and the final destination device (hereinafter may be referred to as a "next-hop device"), through the wireless LAN. The above description corresponds to the overview of the downlink flow.

In addition, the terminal 30 judges whether the base station 10 includes the following function. Such a function is a function to segment a MAC payload into which the plurality of TCP payloads are aggregated, into the respective TCP payloads, and transmit a plurality of packets that individually include the obtained TCP payloads, to the destination communication device. For example, the aggregated MAC payload is obtained by aggregating the plurality of TCP payloads in units of bytes until the MAC payload reaches the maximum length of the MAC SDU which is allowed in the wireless LAN.

In addition, the terminal 30 forms a MAC payload by aggregating a plurality of TCP payloads in units of bytes until the MAC payload reaches the maximum length of the MAC SDU which is allowed in the wireless LAN when the terminal 30 detects that the base station 10 includes such a function. In addition, the terminal 30 configures a packet that includes the formed MAC payload.

On the other hand, the terminal 30 configures a plurality of packets that individually include a plurality of MAC payloads when the terminal 30 detects that the base station 10 does not include such a function.

In addition, the terminal 30 transmits the configured packet to the base station 10 through the wireless LAN. The above description corresponds to the overview of the uplink flow.

As described above, each of the base station 10 and the terminal 30 forms a MAC payload by aggregating a plurality of TCP payloads in units of bytes until the MAC payload reaches the maximum length of a MAC SDU which is allowed in the wireless LAN, and transmits a packet that includes the formed MAC payload.

Therefore, even when the above-described networks in which the sizes of the "allowable ranges" are different from each other are mixed, occurrence of an overhead due to an increase in a gap between packets and due to an increase in a header of the packet may be avoided. As a result, the transmission efficiency in the communication system may be improved.

In addition, the base station 10 executes such aggregation processing when the final destination device is the first type communication device, and does not execute such aggregation processing when the final destination device is the second type communication device.

Therefore, the segmentation processing is not executed in the relay device 70, so that an increase in the processing load may be avoided.

[Configuration of the Base Station]

Figure 8:
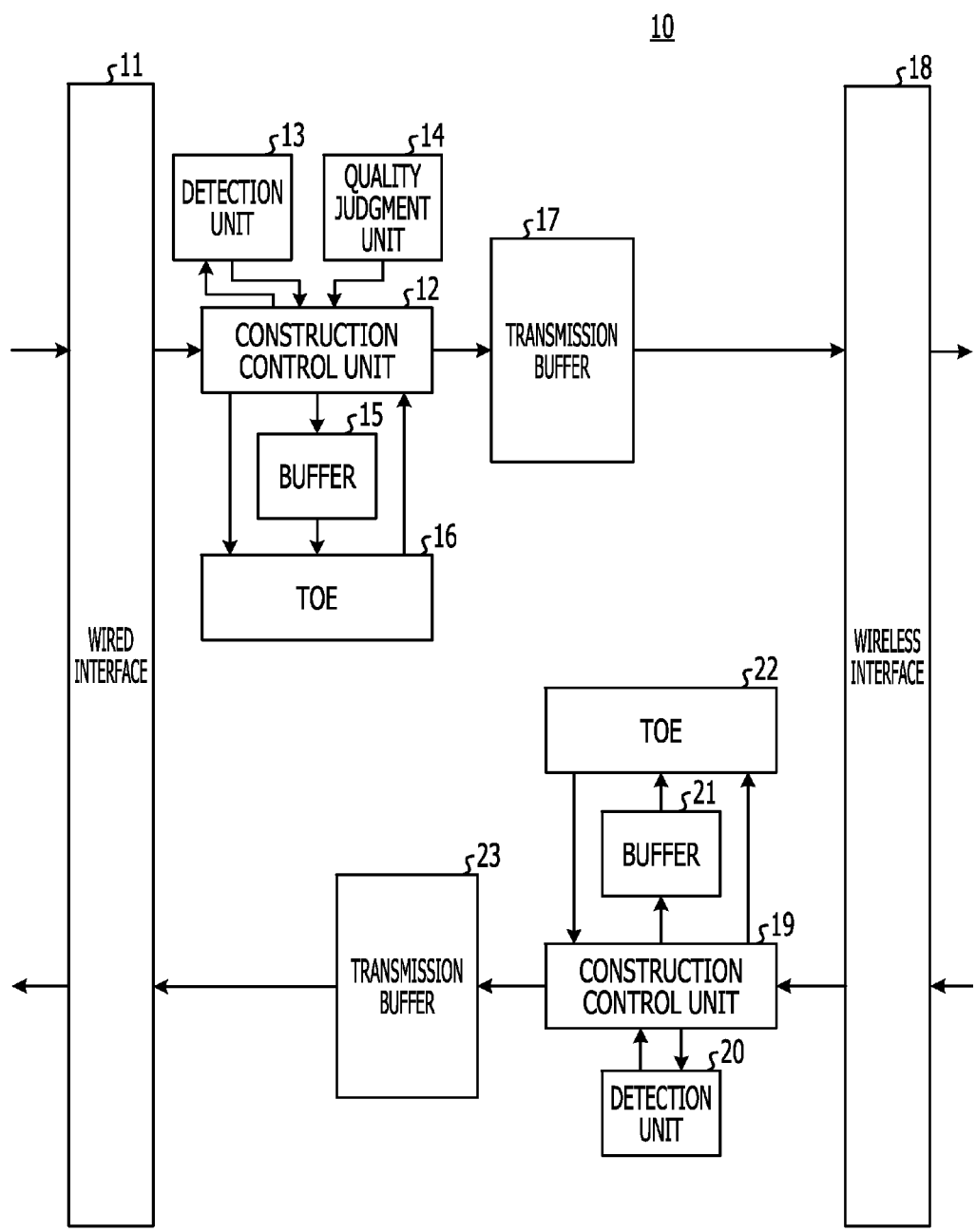
FIG. 8 is a block diagram illustrating an example of a base station according to the first embodiment.

FIG. 8 is a block diagram illustrating an example of the base station according to the first embodiment. In FIG. 8, the base station 10 includes a wired interface 11, construction control units 12 and 19, detection units 13 and 20, a quality judgment unit 14, buffers 15 and 21, TCP/IP off-load engines (TOE) 16 and 22, transmission buffers 17 and 23, and a wireless interface 18.

The wired interface 11 receives a plurality of packets from the communication device 50 through the wired LAN. The plurality of received packets are transmitted to the construction control unit 12. In addition, the wired interface 11 transmits packets that are output from the transmission buffer 23, to the communication device 50 through the wired LAN.

The detection unit 13 receives the plurality of packets through the construction control unit 12 and detects whether the final destination device of the plurality of packets is the first type communication device or the second type communication device. For example, a table that stores MAC addresses of devices that are connected to the base station 10 through the wireless LAN is stored in a memory (not illustrated). The detection unit 13 judges whether a MAC address of a device that corresponds to a destination IP address of the plurality of received packets is stored in the table, and detects that the final destination device is the first type communication device when the MAC address is stored in the table. On the other hand, the detection unit 13 detects that the final destination device is the second type communication device when the MAC address is not stored in the table.

The quality judgment unit 14 judges the sizes of a threshold value and a quality measurement value of a communication path between the base station 10 and the device that is connected to the base station 10 through the wireless LAN, and outputs the judgment result to the construction control unit 12.

The construction control unit 12 controls the aggregation processing to be executed in the TOE 16 when an "aggregation condition" is satisfied. For example, the construction control unit 12 outputs the plurality of received packets to the buffer 15 and sets information on the maximum length of a MAC SDU in the TOE 16 when the "aggregation condition" is satisfied.

In addition, the construction control unit 12 configures a packet that includes the MAC payload that is formed by the TOE 16, and outputs the configured packet to the transmission buffer 17.

On the other hand, the construction control unit 12 configures a plurality of packets that individually include MAC payloads of the plurality of received packets, and outputs the plurality of configured packets to the transmission buffer 17 when the "aggregation condition" is not satisfied.

Here, such an "aggregation condition" may merely correspond to the following condition 1 or, may correspond to both of the following conditions 1 and 2.

(Condition 1) The final destination device is the first type communication device.

(Condition 2) As a result of the judgment by the quality judgment unit 14, a quality measurement value of a communication path between the final destination device and the base station 10 through the wireless LAN is the threshold value or more.

The TOE 16 receives the information on the maximum length of the MAC SDU from the construction control unit 12, and receives the plurality of packets from the buffer 15. In addition, the TOE 16 forms a MAC payload by aggregating TCP payloads that are included in the plurality of packets. The aggregation of the TCP payloads is performed in units of bytes until the MAC payload reaches the maximum length of the MAC SDU which is allowed in the wireless LAN. The formed MAC payload is output to the construction control unit 12.

Here, the TOE may be constituted not by a general-purpose CPU but by hardware specific to the aggregation function. The TOE executes processing such as recalculation of a checksum of an IP header, rewriting of a packet length of a TCP header, and recalculation of a checksum of the TCP header, with the aggregation processing. In such processing, the load is heavy for the general-purpose CPU. Therefore, using the TOE that is the dedicated hardware, the aggregation processing, and the like, may be processed at a high speed without increasing the load of the CPU.

The transmission buffer 17 successively outputs the input packet to the wireless interface 18. Here, the buffer 15 is a buffer in which packets to be subject to the aggregation processing by the TOE 16 are temporarily stored, and the transmission buffer 17 is a buffer in which packets to be transmitted through the wireless LAN are temporarily stored. Packets not to be subject to the aggregation processing are not stored in the buffer 15 but stored in the transmission buffer 17.

The wireless interface 18 transmits the packets that are output from the transmission buffer 17, to the terminal 30 or the relay device 70 through the wireless LAN. In addition, the wireless interface 18 receives a plurality of packets from the terminal 30 or the relay device 70 through the wireless LAN.

The detection unit 20 receives the plurality of packets through the construction control unit 19 and detects whether each of the packets is a packet to be segmented. Such detection is performed depending on whether the size of a MAC payload of each of the packets is larger than the maximum value of a MAC SDU in the wired LAN. For example, the detection unit 20 detects that such a target packet is a packet to be segmented when the size of the MAC payload of the target packet is larger than the maximum value of the MAC SDU in the wired LAN. On the other hand, the detection unit 20 detects that such a target packet is not the packet to be segmented when the size of the MAC payload of the target packet is equal to or less than the maximum value of the MAC SDU in the wired LAN.

The construction control unit 19 controls the segmentation processing in the TOE 22 to be executed when a "segmentation condition" is satisfied. For example, the construction control unit 19 outputs the plurality of received packets to the buffer 21 and sets information on the maximum length of the MAC SDU in the wired LAN to the TOE 22 when the "segmentation condition" is satisfied.

In addition, the construction control unit 19 configures a packet that includes a MAC payload that is formed by the TOE 22, and outputs the configured packet to the transmission buffer 23.

On the other hand, the construction control unit 19 configures a plurality of packets that individually include MAC payloads of the plurality of received packets and outputs the plurality of configured packets to the transmission buffer 23 when the "segmentation condition" is not satisfied.

Here, the segmentation condition is that the size of the MAC payload is larger than the maximum value of the MAC SDU in the wired LAN.

The TOE 22 receives the information on the maximum length of the MAC SDU in the wired LAN from the construction control unit 19, and receives the plurality of packets from the buffer 21. In addition, the TOE 22 forms a plurality of MAC payloads by segmenting and redistributing the TCP payloads that are individually included in the packets. The segmentation and redistribution of the TCP payloads are performed so that the MAC payload corresponds to the maximum length of the MAC SDU in the wired LAN in units of bytes. The formed MAC payload is output to the construction control unit 19.

The transmission buffer 23 successively outputs the input packet to the wired interface 11. Here, the buffer 21 is a buffer in which packets to be subject to the segmentation processing by the TOE 22 are temporarily stored, and the transmission buffer 23 is a buffer in which packets to be transmitted through the wired LAN are temporarily stored. Packets not to be subject to the segmentation processing are not stored in the buffer 21 but stored in the transmission buffer 23.

[Configuration of the Terminal]

Figure 9:
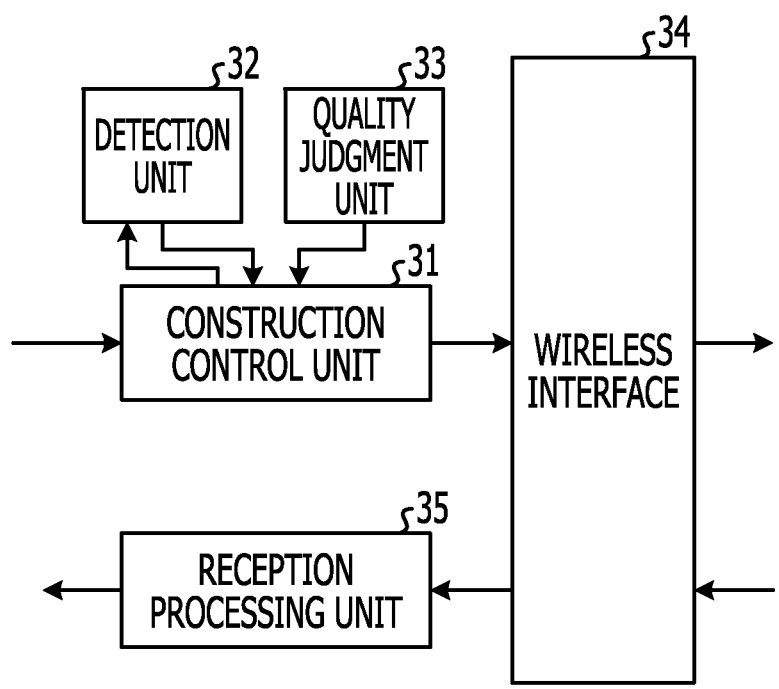
FIG. 9 is a block diagram illustrating an example of a terminal according to the first embodiment.

FIG. 9 is a block diagram illustrating an example of the terminal according to the first embodiment. In FIG. 9, the terminal 30 includes a construction control unit 31, a detection unit 32, a quality judgment unit 33, a wireless interface 34, and a reception processing unit 35.

The detection unit 32 detects whether the base station 10 that is a connection destination includes the above-described segmentation processing function of the TCP payloads (hereinafter may be referred to as a "TCP segmentation function"). For example, a table that stores a basic service set ID (BSSID) of the base station 10 that is the connection destination candidate and includes the TCP segmentation function is stored in a memory (not illustrated). The detection unit 32 detects that the TCP segmentation function is included in the base station 10 that is the connection destination when the BSSID of the base station 10 that is the connection destination is stored in the table.

The quality judgment unit 33 judges the size of a threshold value and a quality measurement value of a communication path between the terminal 30 and the base station 10 that is the connection destination, and outputs the judgment result to the construction control unit 31.

The construction control unit 31 forms a MAC payload by aggregating a plurality of TCP payloads in units of bytes until the MAC payload reaches the maximum length of the MAC SDU which is allowed in the wireless LAN when an "aggregation condition" is satisfied. In addition, the construction control unit 31 configures a packet that includes the formed MAC payload.

On the other hand, the construction control unit 31 configures a plurality of packets that individually include a plurality of MAC payloads when the "aggregation condition" is not satisfied. The packets that are configured in the construction control unit 31 are transmitted to the base station 10 that is the connection destination, through the wireless interface 34.

Here, an "aggregation condition" may merely correspond to the following condition 3, or may correspond to the both of the following conditions 3 and 4.

(Condition 3) The TCP segmentation function is included in the base station 10 of the connection destination, which is a next-hop device.

(Condition 4) A quality measurement value of the communication path between the terminal 30 and the base station 10 that is the connection destination through the wireless LAN is a threshold value or more, as a result of the judgment of the quality judgment unit 33.

The wireless interface 34 transmits the packet that is configured by the construction control unit 31, to the base station 10 that is the connection destination through the wireless LAN. In addition, the wireless interface 34 receives a packet that is transmitted from the base station 10 that is the connection destination through the wireless LAN and outputs the received packet to the reception processing unit 35.

The reception processing unit 35 executes certain reception processing on the packet that is received from the wireless interface 34, and hands over the obtained data to an application program. Here, the certain reception processing includes, for example, processing of deleting a header such as a MAC header and a TCP/IP header.

[Operation of the Base Station and the Terminal]

Processing operations of the base station 10 and the terminal 30 that include the above-described configuration are described. Hereinafter, a processing operation of the base station 10 in the downlink flow and a processing operation of the base station 10 and the terminal 30 in the uplink flow are described separately.

<Downlink Flow>

<Processing Operation of the Base Station 10>

Figure 10:
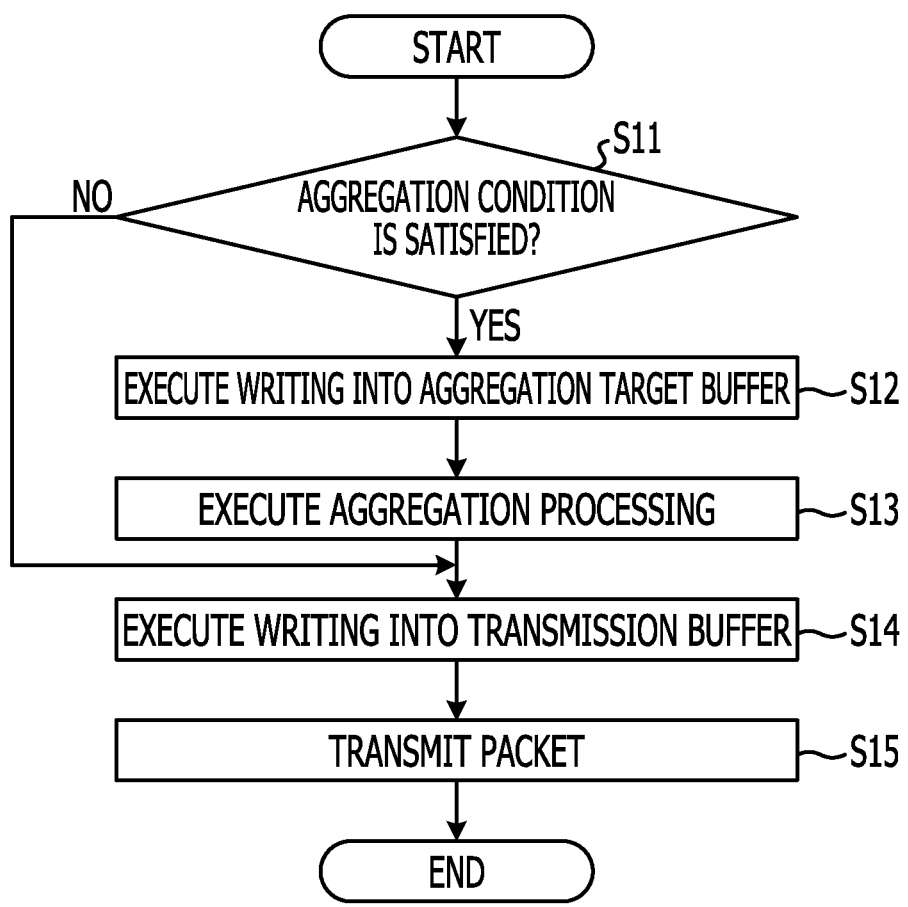
FIG. 10 is a flowchart used to explain a processing operation of the base station in downlink flow.

FIG. 10 is a flowchart used to explain the processing operation of the base station in the downlink flow.

When the base station 10 receives a plurality of packets from the communication device 50 through the wired LAN, the flow of FIG. 10 starts.

In the base station 10, the construction control unit 12 judges whether the aggregation condition is satisfied (Step S11). Here, as described above, the aggregation condition may merely correspond to the condition 1, or may correspond to both of the conditions 1 and 2. Here, when the aggregation condition corresponds to the condition 2 in addition to the condition 1, a retransmission data amount may be reduced. That is, the packet on which the aggregation processing is executed is retransmitted in units of such packets. Thus, the retransmission data amount of the packet on which the aggregation processing is executed is large as compared with a packet on which the aggregation processing is not executed. Therefore, the retransmission data amount may be reduced by not executing the aggregation processing when it is highly probable that the retransmission is executed because a quality of a propagation channel is reduced.

When the aggregation condition is satisfied (Yes in Step S11), the construction control unit 12 writes the plurality of received packets onto the buffer 15 that is an aggregation target buffer (Step S12).

The TOE 16 aggregates TCP payloads that are included in the plurality of packets received from the buffer 15 (Step S13) to form a MAC payload. The aggregation of the TCP payloads is performed in units of bytes until the MAC payload reaches the maximum length of the MAC SDU which is allowed in the wireless LAN. In addition, the construction control unit 12 configures a packet that includes the MAC payload that is formed by the TOE 16.

Figure 11:
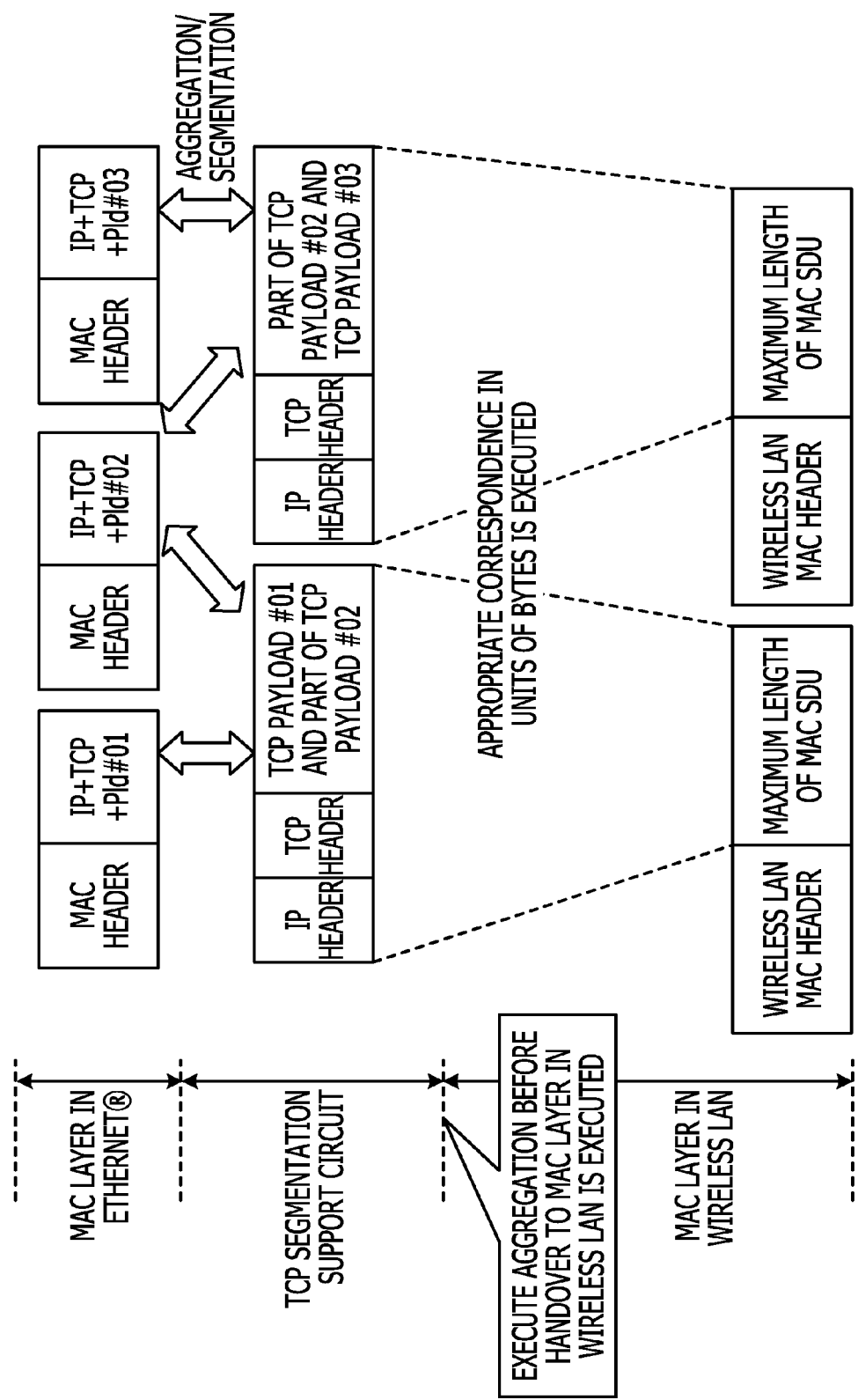
FIG. 11 is a diagram schematically illustrating aggregation processing and segmentation processing in a case of IEEE802.11b/a/g.

Here, FIG. 11 is a diagram schematically illustrating aggregation processing and segmentation processing in a case of IEEE802.11b/a/g. FIG. 12 is a diagram schematically illustrating aggregation processing and segmentation processing in a case of IEEE802.11n. As illustrated in FIGS. 11 and 12, the MAC payload that is formed in the base station 10 appropriately corresponds to the maximum length of the MAC SDU in units of bytes.

Returning to FIG. 10, when the aggregation condition is not satisfied (No in Step S11), the construction control unit 12 configures a plurality of packets that individually include MAC payloads of the plurality of received packets.

The construction control unit 12 writes the configured packets onto the transmission buffer 17 (Step S14).

The transmission buffer 17 successively outputs the input packet to the wireless interface 18, and the wireless interface 18 transmits the packets that are output from the transmission buffer 17, to the terminal 30 or the relay device 70 through the wireless LAN (Step S15). Here, the packet that includes the MAC payload formed by the TOE 16, that is, the MAC payload that is obtained by aggregating TCP payloads is transmitted to the terminal 30.

Detection processing in the detection unit 13 is described below. FIGS. 13A to 13C are diagrams used to explain the detection processing in the detection unit.

In FIG. 13A, a packet configuration is illustrated in which a destination MAC address is an address of the terminal 30, and a destination IP address is the address of the terminal 30. In addition, in FIG. 13B, a packet configuration is illustrated in which the destination MAC address is an address of the communication device 90 that is a relay destination, and the destination IP address is the address of the communication device 90 that is the relay destination. That is, when a packet having such a configuration is transmitted, the relay device 70 is a bridge. In addition, in FIG. 13C, a packet configuration is illustrated in which the destination MAC address is an address of the relay device 70, and the destination IP address is the address of the communication device 90 that is the relay destination. That is, when a packet having such a configuration is transmitted, the relay device 70 is a router.

Here, as described above, the MAC address of the device that is connected to the base station 10 through the wireless LAN is stored in the table. In addition, the destination IP address of a packet is the address of the final destination device.

When the destination IP address of the packet belongs to a sub-network to which the base station 10 also belongs, that is, a network in which the packet may reach a device that corresponds to the destination IP address without a router, a MAC address of a device that corresponds to the destination IP address is the same as the destination MAC address of the packet. Thus, in a case in which the destination IP address and the base station 10 are in the same sub-network, the detection unit 13 judges that the final destination device is a wireless LAN terminal that is the first type communication device when the destination MAC address of the packet is stored in the table. The destination MAC address in FIG. 13A is stored in the table, however, the destination MAC address in FIG. 13B is the address of the communication device 90 that is the relay destination and is not the MAC address of the device that is connected to the base station 10 through the wireless LAN, so that the destination MAC address in FIG. 13B is not stored in the table. Thus, the detection unit 13 detects that the final destination device in FIG. 13A is the first type communication device, and detects that the final destination device in FIG. 13B is the second type communication device.

On the other hand, when the destination IP address of the packet does not belong to the sub-network to which the base station 10 also belongs, the MAC address of the device that corresponds to the destination IP address is a MAC address that is different from the destination MAC address of the packet. When the destination IP address and the base station 10 are not in the same sub-network, the router relays the packet, so that the detection unit 13 detects that the final destination device is not the wireless LAN terminal that is the first type communication device. The detection unit 13 detects whether the destination IP address and the base station 10 are in the same sub-network, on the basis of a value of a higher-order bits group in the destination IP address of the packet. The detection unit 13 detects that the destination IP address in FIG. 13C and the base station 10 do not belong to the same sub-network, and detects that the final destination device is not the wireless LAN terminal that is the first type communication device.

<Uplink Flow>

<Processing Operation of the Terminal 30>

Figure 14:
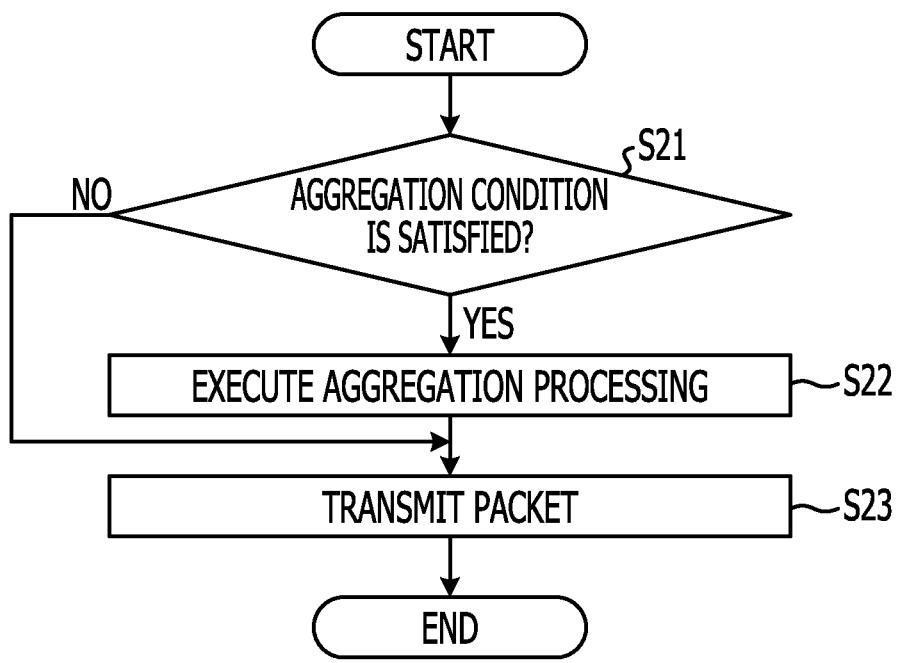
FIG. 14 is a flowchart used to explain a processing operation of the terminal in uplink flow.

FIG. 14 is a flowchart used to explain the processing operation of the terminal in the uplink flow.

When a transmission packet occurs in the terminal 30, the flow of FIG. 14 starts.

In the terminal 30, the construction control unit 31 judges whether the aggregation condition is satisfied (Step S21). Here, as described above, the aggregation condition may merely correspond to the condition 3, or may be correspond to both of the conditions 3 and 4. Here, when the aggregation condition corresponds to the condition 4 in addition to the aggregation 3, a retransmission data amount may be reduced. That is, the packet on which the aggregation processing is executed is retransmitted in units of such packets. Thus, the retransmission data amount of the packet on which the aggregation processing is executed is large as compared with a packet on which the aggregation processing is not executed. Therefore, the retransmission data amount may be reduced by not executing the aggregation processing when it is highly probable that the retransmission is executed because a quality of a propagation channel is less than a certain level.

When the aggregation condition is satisfied (Yes in Step S21), the construction control unit 31 aggregates a plurality of TCP payloads in units of bytes until a MAC payload reaches the maximum length of the MAC SDU which is allowed in the wireless LAN (Step S22). As a result, the MAC payload is formed. In addition, the construction control unit 31 configures a packet that includes the formed MAC payload.

When the aggregation condition is not satisfied (No in Step S21), the construction control unit 31 configures a plurality of packets that individually include MAC payloads of the plurality of packets.

In addition, the wireless interface 34 transmits the packet that is configured by the construction control unit 31 to the base station 10 that is the connection destination through the wireless LAN (Step S23).

<Processing Operation of the Base Station 10>

Figure 15:
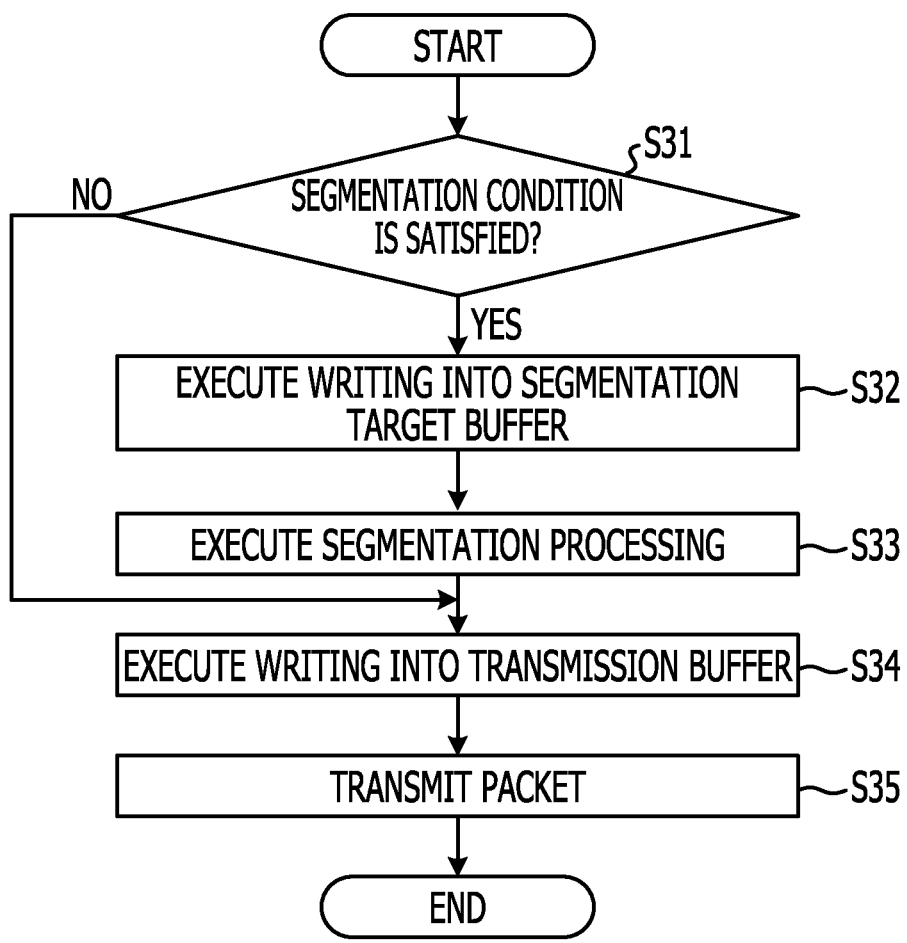
FIG. 15 is a flowchart used to explain a processing operation of the base station in the uplink flow.

FIG. 15 is a flowchart used to explain a processing operation of the base station in the uplink flow.

When the base station 10 receives a plurality of packets through the wireless LAN, the flow of FIG. 15 starts.

In the base station 10, the construction control unit 19 judges whether the segmentation condition is satisfied (Step S31). Here, as described above, the segmentation condition is that the size of the MAC payload is larger than the maximum value of the MAC SDU in the wired LAN.

When the segmentation condition is satisfied (Yes in Step S31), the construction control unit 19 writes the plurality of received packets onto the buffer 21 (Step S32).

The TOE 22 segments and redistributes TCP payloads that are individually included in the packets received from the buffer 21 (Step S33) to form a MAC payload. Such segmentation and redistribution of the TCP payloads are executed so that the MAC payload corresponds to the maximum length of the MAC SDU in the wired LAN in units of bytes. In addition, the construction control unit 19 configures a packet that includes the MAC payload formed by the TOE 22.

When the segmentation condition is not satisfied (No in Step S31), the construction control unit 19 configures a plurality of packets that individually include MAC payloads of the plurality of received packets.

The construction control unit 19 writes the configured packet onto the transmission buffer 23 (Step S34).

The transmission buffer 23 successively outputs the input packet to the wired interface 11, and the wired interface 11 transmits the packets that are output from the transmission buffer 23, to the communication device 50 through the wired LAN (Step S35).

As described above, in the first embodiment, in the base station 10, the TOE 16 forms a MAC payload by aggregating the plurality of TCP payloads that are included in the plurality of packets that are received through the wired LAN in units of bytes until the MAC payload reaches the maximum length of the MAC SDU which is allowed in the wireless LAN. In addition, the construction control unit 12 configures a packet that includes the MAC payload formed by the TOE 16 and transmits the packet to the wireless LAN terminal 30.

Therefore, generation of an overhead due to an increase in a gap between packets and due to an increase in a header of the packet may be avoided. As a result, the transmission efficiency in the communication system may be improved.

In addition, the construction control unit 12 causes the TOE 16 to execute such aggregation processing when the final destination device is the first type communication device, and does not cause the TOE 16 to execute such aggregation processing when the final destination device is the second type communication device.

Therefore, the segmentation processing is not executed in the relay device 70, so that an increase in processing load may be avoided.

In addition, the construction control unit 12 controls the aggregation processing in the TOE 16 not to be executed when a quality measurement value of the communication path between the final destination device and the base station 10 through the wireless LAN is less than the threshold value, as a result of the judgment by the quality judgment unit 14.

Therefore, when it is highly probable that the retransmission is executed, a packet that includes a TCP on which aggregation is not executed is transmitted, so that an increase in a retransmission data amount may be avoided. As a result, the transmission efficiency in the communication system may be improved.

Second Embodiment

A second embodiment is related to a method of detecting by the terminal whether the base station includes the TCP segmentation function.

Figure 16:
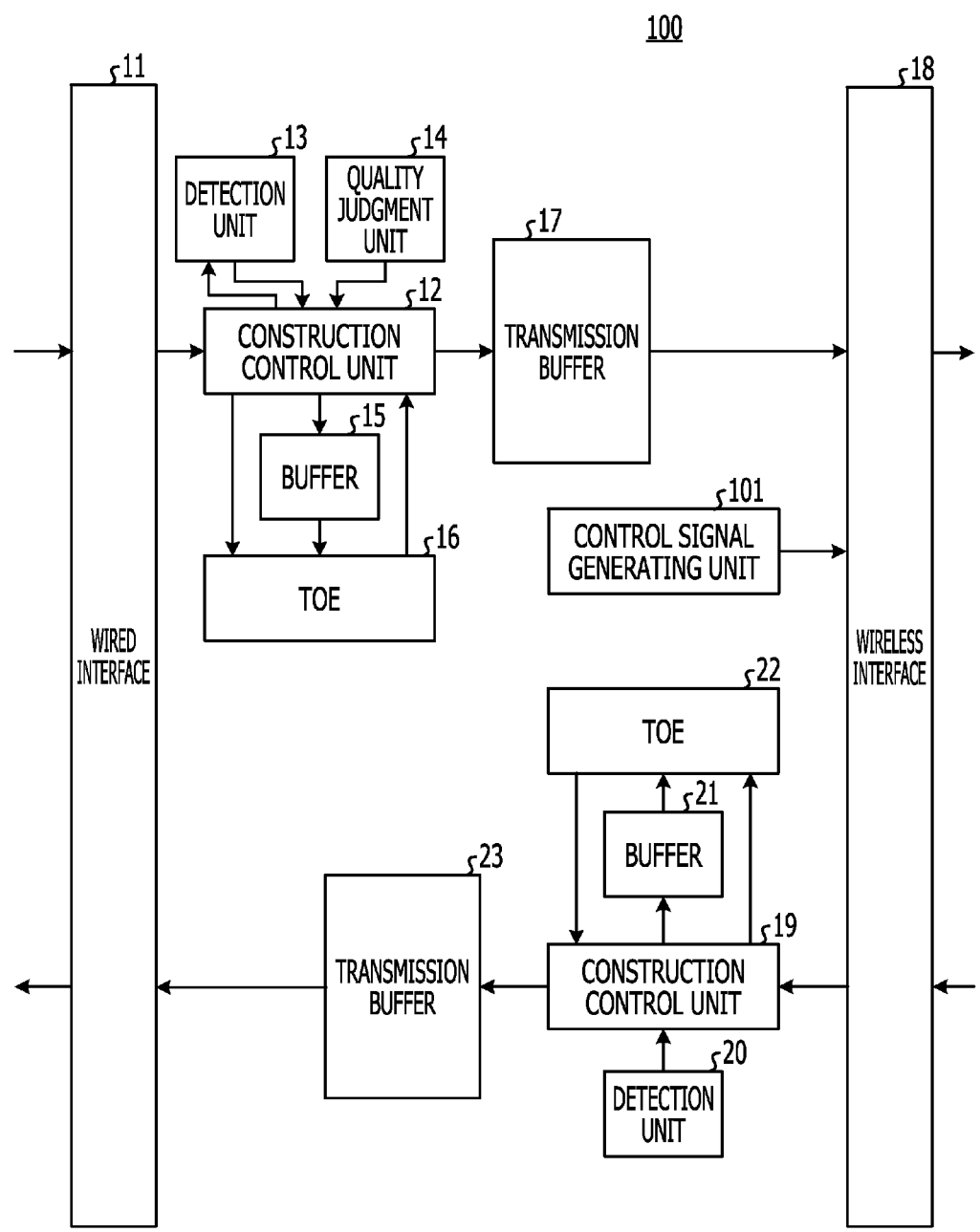
FIG. 16 is a block diagram illustrating an example of a base station according to a second embodiment.

FIG. 16 is a block diagram illustrating an example of a base station according to a second embodiment. In FIG. 16, a base station 100 includes a control signal generation unit 101.

The control signal generation unit 101 generates a control signal that includes identification information of the base station 100 and information that indicates that the base station 100 includes the TCP segmentation function. The control signal is transmitted to the terminal 30 that is connected to the base station 100 through a wireless LAN, by a wireless interface.

Figure 17:
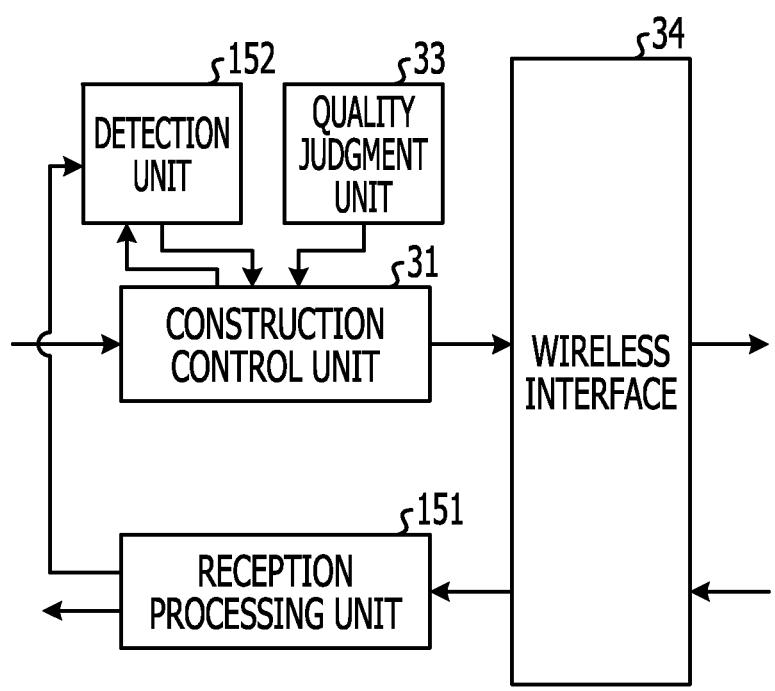
FIG. 17 is a block diagram illustrating an example of a terminal according to the second embodiment.

FIG. 17 is a block diagram illustrating an example of a terminal according to the second embodiment. In FIG. 17, a terminal 150 includes a reception processing unit 151 and a detection unit 152.

The reception processing unit 151 receives the control signal that is transmitted from the base station 100, through the wireless interface 34 and outputs the control signal to the detection unit 152 after the reception processing.

The detection unit 152 receives the control signal from the reception processing unit 151 and detects whether the TCP segmentation function is included in the base station 100 that is the connection destination on the basis of the information that is included in the control signal and that indicates that the base station 100 includes the TCP segmentation function.

As described above, in the second embodiment, the terminal 150 may detects whether the TCP segmentation function is included in the base station 100 on the basis of the control signal that is transmitted from the base station 100.

Third Embodiment

A third embodiment is related to retransmission control of a packet that is transmitted from a communication device to a terminal by a base station, and retransmission control of a packet that is transmitted from the terminal to the communication device by the base station. Here, in a TCP, delivery confirmation of End to End is executed not in units of packets but in units of bytes. Thus, even when the aggregation and segmentation is executed in a TCP layer, inconvenience does not generally occur in the TCP layer. However, practically, it is probable that there exist a terminal and a communication device that merely executes retransmission using a TCP payload that is included in a packet by the terminal and the communication device, as a unit. It is probable that the terminal and communication device may not execute the retransmission processing desirably when the aggregation processing and segmentation processing are executed in the middle of a route. Therefore, in the third embodiment, retransmission control by the base station, by which such inconvenience may be reduced, is realized.

[Configuration of a Base Station]

Figure 18:
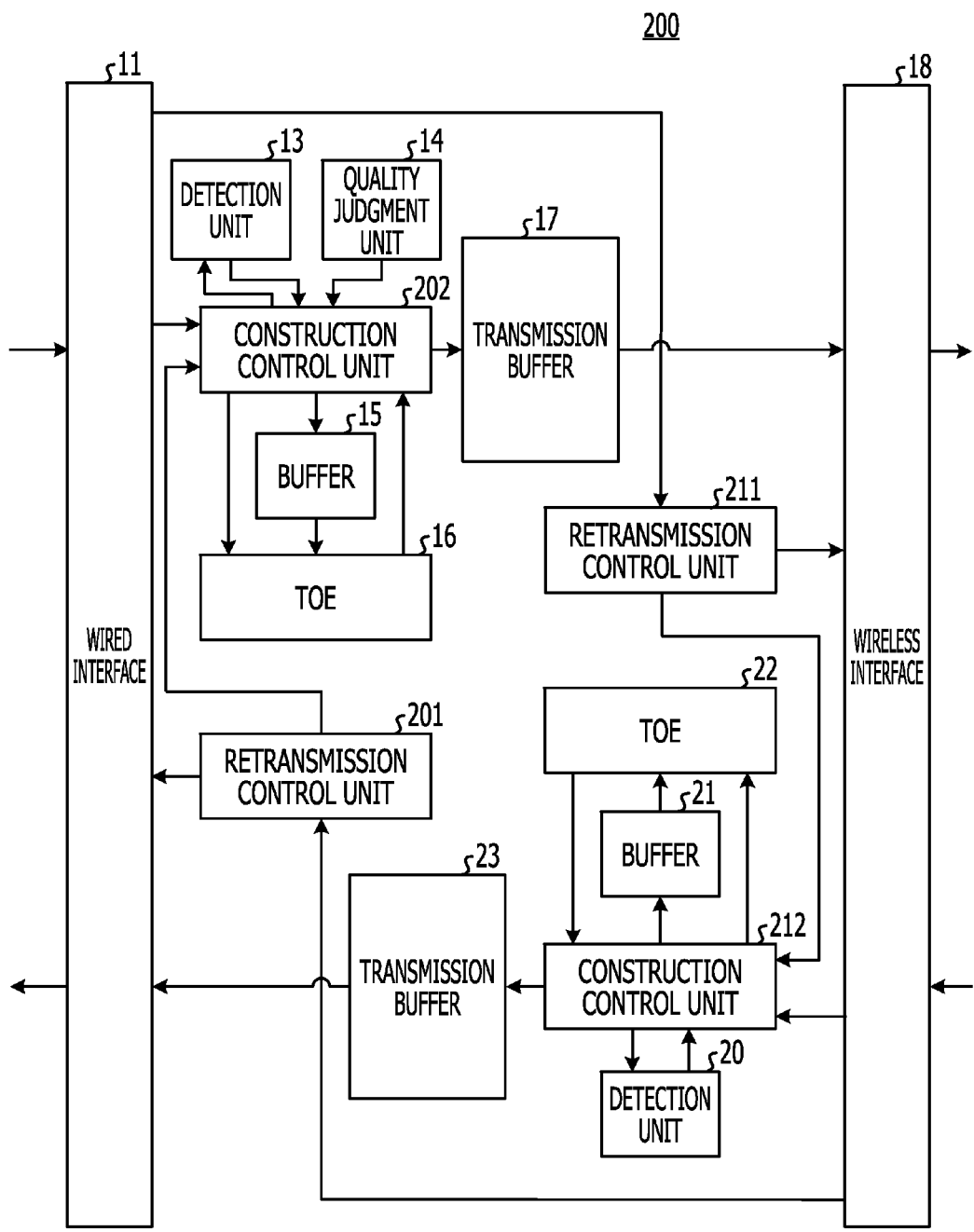
FIG. 18 is a block diagram illustrating an example of a base station according to a third embodiment.

FIG. 18 is a block diagram illustrating an example of a base station according to the third embodiment. In FIG. 18, a base station 200 includes retransmission control units 201 and 211, and construction control units 202 and 212.

The retransmission control unit 201 controls retransmission of a packet that is transmitted from the communication device 50 to a terminal 250 that is described later.

For example, the retransmission control unit 201 receives a delivery confirmation response that is transmitted from the terminal 250 through the wireless interface 18. In such a delivery confirmation response, acknowledgment (ACK) and selective acknowledgment (SACK) are included. The ACK includes information that indicates a continuously received first portion in a series of transmission data string (hereinafter referred to as a "first portion"). In the ACK, for example, the last sequence number of the first portion is included. In addition, the SACK includes information that indicates a continuously received portion other than the first portion in the series of transmission data string (hereinafter referred to as a "second portion"). For example, in the SACK, the first and last sequence numbers of the second portion are included. That is, in the delivery confirmation response, "success range information" that indicates a portion that is successfully received at the reception side is included.

In addition, the retransmission control unit 201 forms a changed delivery confirmation response (hereinafter referred to as a "changed response") by rewriting the success range information that is included in the received delivery confirmation response to a unit of a TCP payload to be transmitted by the communication device 50.

In addition, the retransmission control unit 201 outputs the received delivery confirmation response, that is, the delivery confirmation response that is not changed (hereinafter may be referred to as a "non-changed response") and the changed response to the construction control unit 202 and transmits the changed response to the communication device 50 through the wired interface 11.

The construction control unit 202 includes a function that is similar to the function of the construction control unit 12 according to the first embodiment.

In addition, the construction control unit 202 receives a retransmission packet that is transmitted from the communication device 50 in response to the changed response, through the wired interface 11. In addition, the construction control unit 202 deletes data that is included in a success range that is indicated by the non-changed response in a TCP payload included in the retransmission packet, and forms a MAC payload that includes a TCP payload in which the TCP payload after the aggregation is set as a unit, using data outside the success range indicated the non-changed response. In addition, the construction control unit 202 configures a retransmission packet that includes the formed MAC payload (hereinafter referred to as a "changed retransmission packet"). The changed retransmission packet as configured above is transmitted to the terminal 250 through the transmission buffer 17 and the wireless interface 18.

The retransmission control unit 211 controls retransmission of the packet that is transmitted from the terminal 250 to the communication device 50.

For example, the retransmission control unit 211 receives the delivery confirmation response that is transmitted from the communication device 50, through the wired interface 11. In the delivery confirmation response, the above-described ACK and SACK are included. In addition, the retransmission control unit 211 forms a changed response by rewriting success range information included in the received delivery confirmation response to a unit of a TCP payload to be transmitted by the terminal 250.

In addition, the retransmission control unit 211 outputs the received delivery confirmation response (that is, non-changed response) and the changed response to the construction control unit 212 and transmits the changed response to the terminal 250 through the wireless interface 18.

The construction control unit 212 includes a function that is similar to the function of the construction control unit 19 according to the first embodiment.

In addition, the construction control unit 212 receives a retransmission packet that is transmitted from the terminal 250 in response to the changed response, through the wireless interface 18. In addition, the construction control unit 212 deletes data that is included in a success range indicated by the non-changed response in a TCP payload included in the retransmission packet, and forms a MAC payload that includes a TCP payload in which the TCP payload after the segmentation is set as a unit, using data outside the success range indicated by the non-changed response. In addition, the construction control unit 212 configures a changed retransmission packet that includes the formed MAC payload. The changed retransmission packet as configured above is transmitted to the communication device 50 through the transmission buffer 23 and the wired interface 11.

[Configuration of the Terminal]

Figure 19:
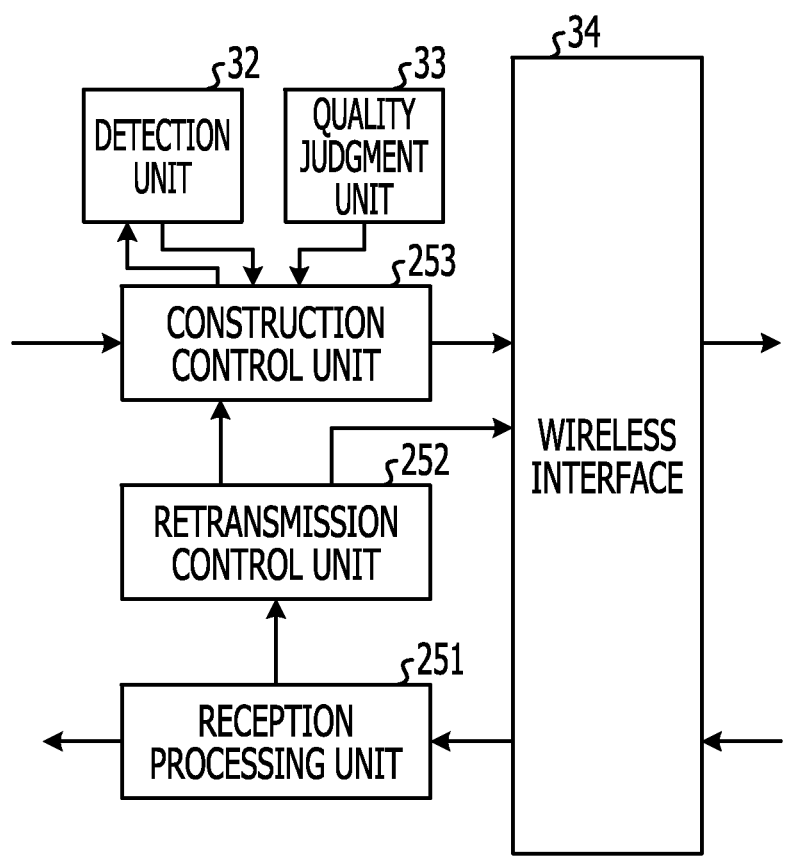
FIG. 19 is a block diagram illustrating an example of a terminal according to the third embodiment.

FIG. 19 is a block diagram illustrating an example of the terminal according to the third embodiment. In FIG. 19, the terminal 250 includes a reception processing unit 251, a retransmission control unit 252, and a construction control unit 253.

The reception processing unit 251 receives a downlink packet that is transmitted from the base station 200. In addition, the reception processing unit 251 executes error detection processing of a downlink packet that is judged that the reception is failed because a specific timer value has elapsed and error detection processing of a received downlink packet, and outputs the last sequence number of the first portion and the first and last sequence numbers of the second portion to the retransmission control unit 252 on the basis of the sequence numbers that are included in the downlink packet in which error is detected.

In addition, the reception processing unit 251 receives a changed response for an uplink packet that is transmitted from the terminal 250, through the wireless interface 34, and outputs the received changed response to the retransmission control unit 252.

The retransmission control unit 252 forms a delivery confirmation response for the downlink packet on the basis of the sequence number that is received from the reception processing unit 25, and transmits the formed delivery confirmation response to the base station 200 through the wireless interface 34.

In addition, the retransmission control unit 252 controls retransmission of the uplink packet on the basis of the changed response that is received from the reception processing unit 251. For example, the retransmission control unit 252 identifies a "failure range" that is not included in a success range that is indicated by the changed response received from the reception processing unit 251, on the basis of the changed response, and outputs information that indicates the identified failure range to the construction control unit 253.

The construction control unit 253 retransmits a packet that includes a TCP payload corresponding to the failure range indicated by the information that is received from the retransmission control unit 252. Here, the success range indicated by the changed response that is transmitted from the base station 200 is matched with a unit of a TCP payload of the packet that is transmitted from the terminal 250. Thus, the terminal 250 may retransmit the packet that has been transmitted last time, without any change.

[Operations of the Base Station and the Terminal]

Processing operations of the base station and the terminal that include the above-described configuration are described. Hereinafter, processing operations of the base station 200 and the terminal 250 in the downlink flow and processing operations of the base station 200 and the terminal 250 in the uplink flow are described separately.

<Downlink Flow>

Figure 20:
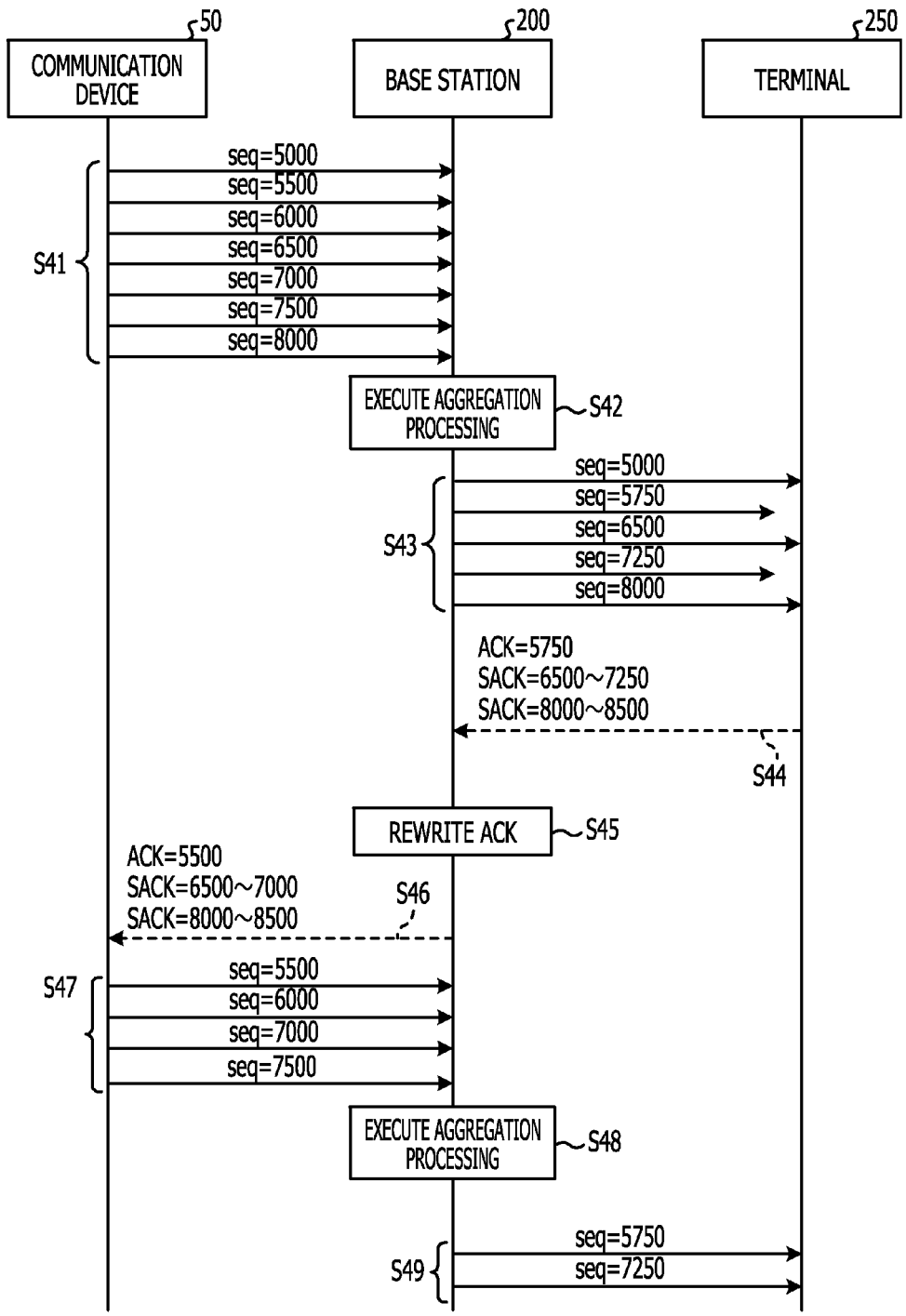
FIG. 20 is a sequence diagram used to explain processing operations of a communication device, the base station, and the terminal in the downlink flow.

FIG. 20 is a sequence diagram used to explain processing operations of a communication device, the base station, and the terminal in the downlink flow. FIGS. 21A to 21G are diagrams used to explain the processing operations of the communication device, the base station, and the terminal in the downlink flow. In each of FIGS. 21A to 21G, the status of a packet the transmission or reception of which is performed in the communication device, the base station, or the terminal and processing contents in the communication device, the base station, or the terminal are illustrated.

Figure 21:
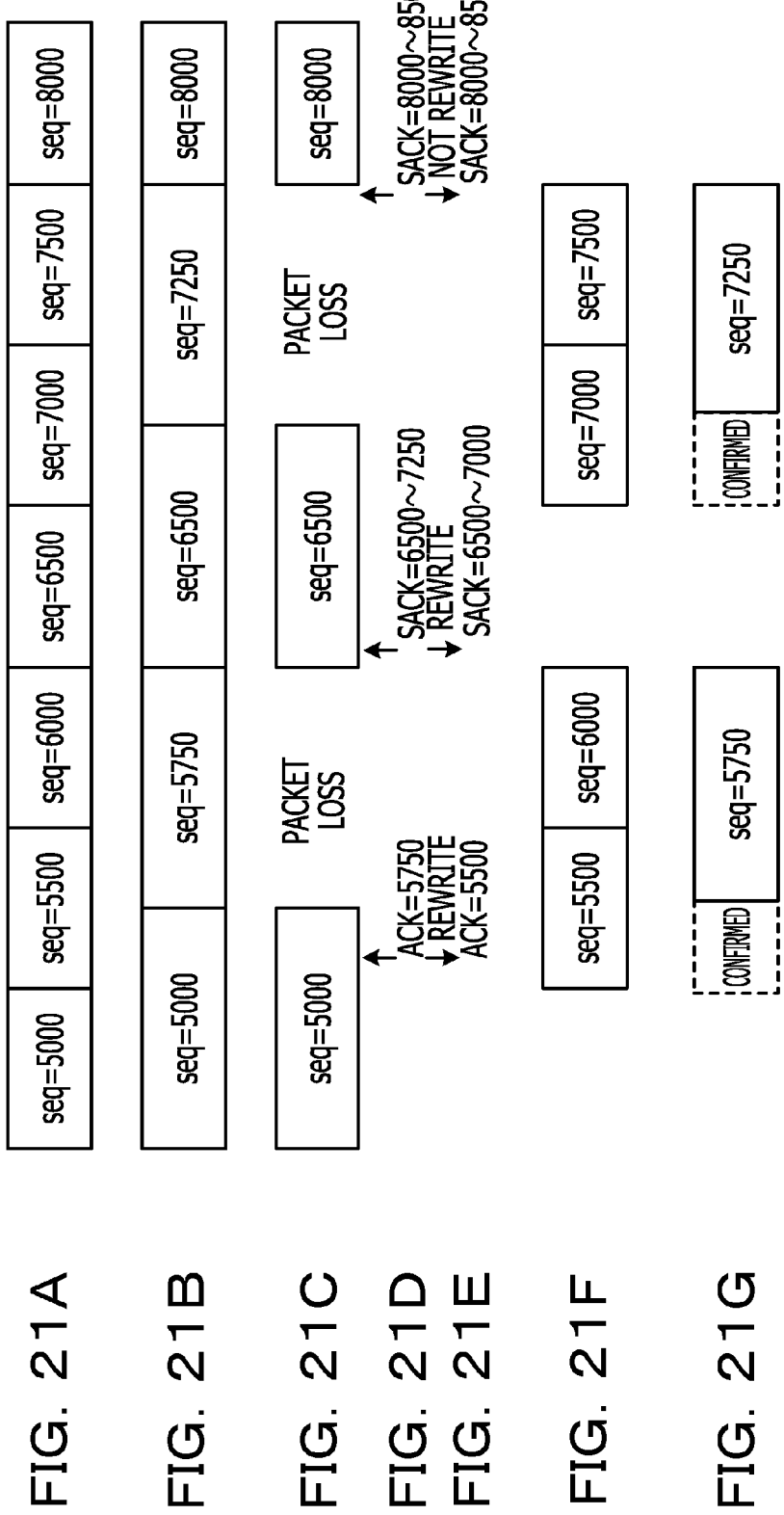
FIGS. 21A to 21G are diagrams used to explain the processing operations of the communication device, the base station, and the terminal in the downlink flow.

The communication device 50 transmits a series of packets that are destined for the terminal 250, to the base station 200 (Step S41). Here, seven downlink packets are transmitted. In FIG. 21A, the seven transmission packets are schematically illustrated. To a TCP header of each of the packets, a sequence number of the first data (byte) that is included in the TCP payload is assigned. That is, in a packet to which a sequence number of 5000 is assigned, pieces of data of sequence numbers of 5000 to 5499 are included. That is, in the TCP payload of the packet that is transmitted from the communication device 50, 500 bytes are set as a unit.

The construction control unit 202 of the base station 200 controls the aggregation processing (Step S42). The unit of a TCP payload in such aggregation processing is 750 bytes. As a result of the aggregation processing, the seven packets become five packets. In FIG. 21B, the packets that are obtained by the aggregation processing in the base station 200 are schematically illustrated. Here, in a packet to which a sequence number of 8000 is assigned, data of 500 bytes that corresponds to a broken amount is included.

The construction control unit 202 transmits the five packets that are obtained by the aggregation processing to the terminal 250 (Step S43). Here, as illustrated in FIG. 21C, it is assumed that two packets that correspond to sequence numbers of 5750 and 7250 have been lost.

The terminal 250 transmits a delivery confirmation response to the base station 200 (Step S44). The terminal 250 transmits ACK that includes a sequence number obtained by adding one to the largest sequence number in the sequence numbers corresponding to the first portion that has been continuously received. That is, in FIG. 21C, because the continuous first portion by 5749 byte is received successfully, ACK to which a segment number of 5750 is assigned is transmitted, and SACK of sequence numbers of 6500 to 7250 is transmitted, to which the sequence number of 6500 is assigned and which corresponds to the successfully received packets, as illustrated in FIG. 21D. In addition, SACK of sequence numbers of 8000 to 8500 is transmitted, to which the sequence number of 8000 is assigned and which corresponds to the successfully received packet. The ACK and the two pieces of SACK are included in a single packet and transmitted to the base station 200.

In the base station 200, the retransmission control unit 201 rewrites the sequence numbers of the delivery confirmation response that is received from the terminal 250 (Step S45). For example, the retransmission control unit 201 rewrites success range information that is included in the received delivery confirmation response to a unit of a TCP payload that is transmitted by the communication device 50. That is, bytes of the sequence number of 5750 are included in a packet to which a sequence number of 5500 is assigned, of packets that are transmitted from the communication device 50. Thus, the ACK of the sequence number of 5750 indicates successful reception of a packet to which the sequence number of 5000 is assigned and successful reception of part of data that is included in the packet to which the sequence number of 5500 is assigned when the ACK of the sequence number of 5750 is read as a unit of the TCP payload in the communication device 50. Therefore, the retransmission control unit 201 rewrites the ACK of the sequence number of 5750 to changed ACK that indicates the successful reception of the packet that is transmitted from the communication device 50 and to which the sequence number of 5000 is assigned (see FIG. 21E). That is, the sequence number of the ACK is changed so as to correspond to a boundary between TCP payloads before the aggregation, which is less than or equal to the sequence number and the closest to the sequence number. Similarly, the SACK of the sequence numbers of 6500 to 7250 is changed to SACK of sequence numbers of 6500 to 7000. That is, the sequence number of the SACK is rewritten so as to correspond to a boundary between TCP payloads before the aggregation, which is more than or equal to the minimum value of a success range that is indicated by the SACK and the closest to the sequence number, and a boundary between TCP payloads before the aggregation, which are less than or equal to the maximum value of the success range that is indicated by the SACK and the closest to the sequence number. Bytes that are included in the packet to which the sequence number of 8000 is assigned is a unit of the TCP payload in the communication device 50, so that SACK of the sequence number of 8000 is not changed but is directly set as changed SACK.

The base station 200 transmits the changed response to the communication device 50 (Step S46).

The communication device 50 identifies a failure range on the basis of the changed response that is received from the base station 200 and retransmits a packet that corresponds to the failure range (Step S47). The retransmission packets at that time are schematically illustrated in FIG. 21F.

Figure 1:
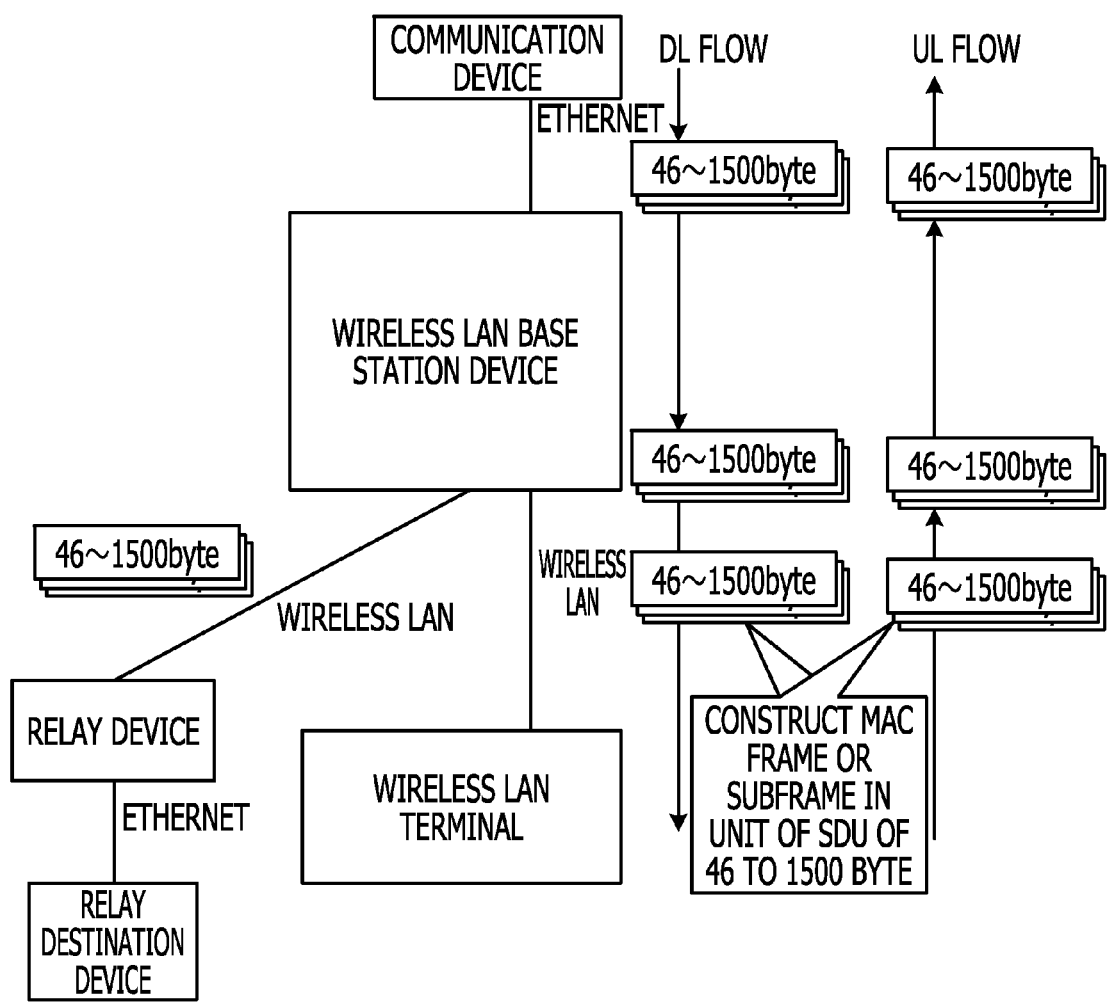
FIG. 1 is a diagram illustrating an example of a communication system.
Figure 2:
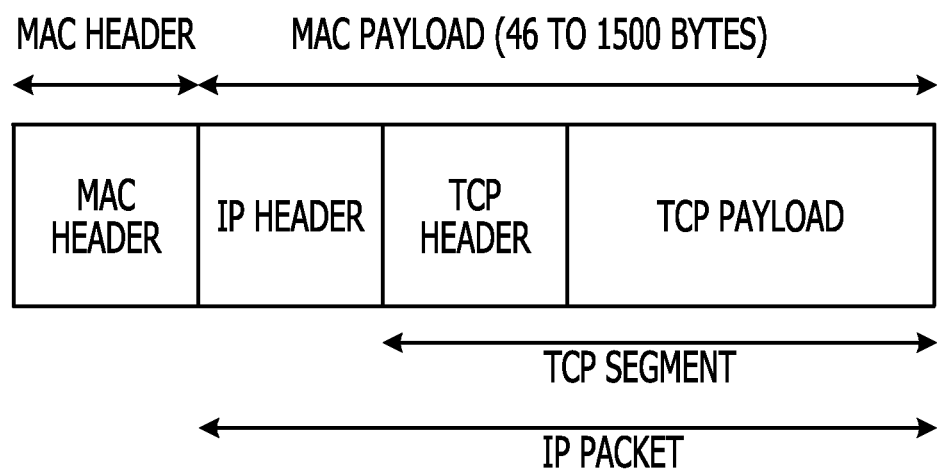
FIG. 2 is a diagram illustrating a format of a MAC frame of the Ethernet®.
Figure 3:
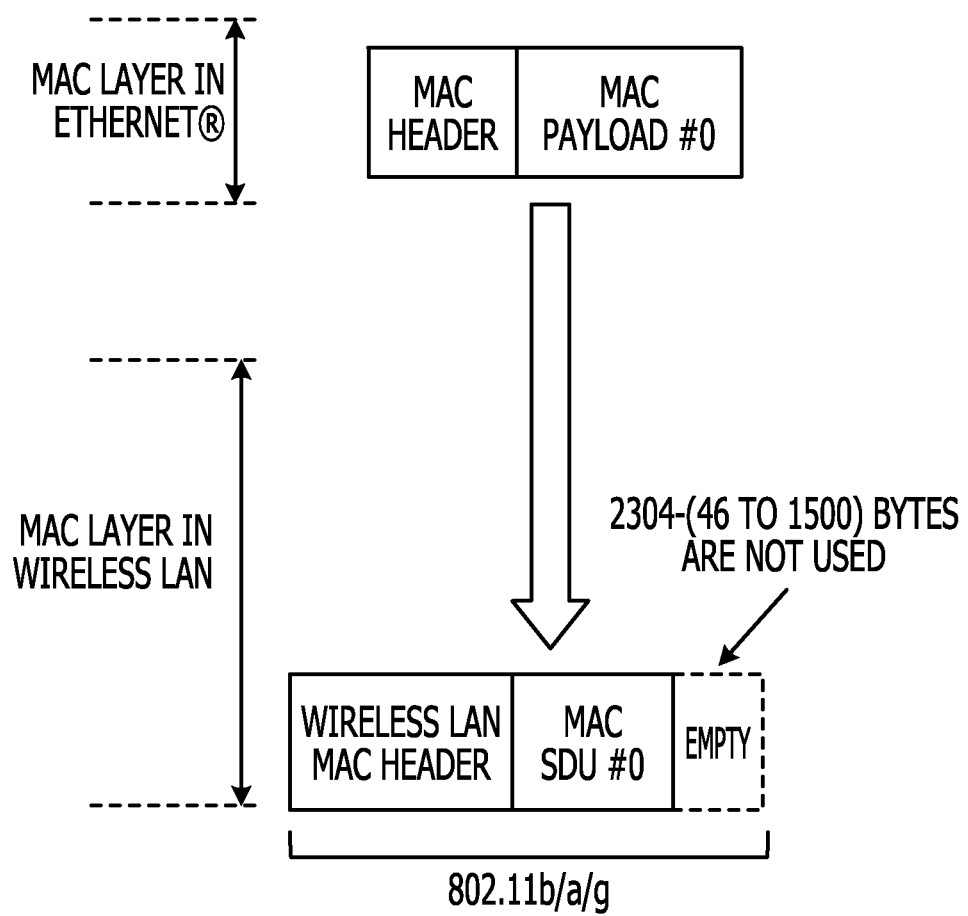
FIG. 3 is diagram used to explain a relationship between a configuration of a MAC frame in a wired LAN and a configuration of a MAC frame in a wireless LAN.
Figure 4:
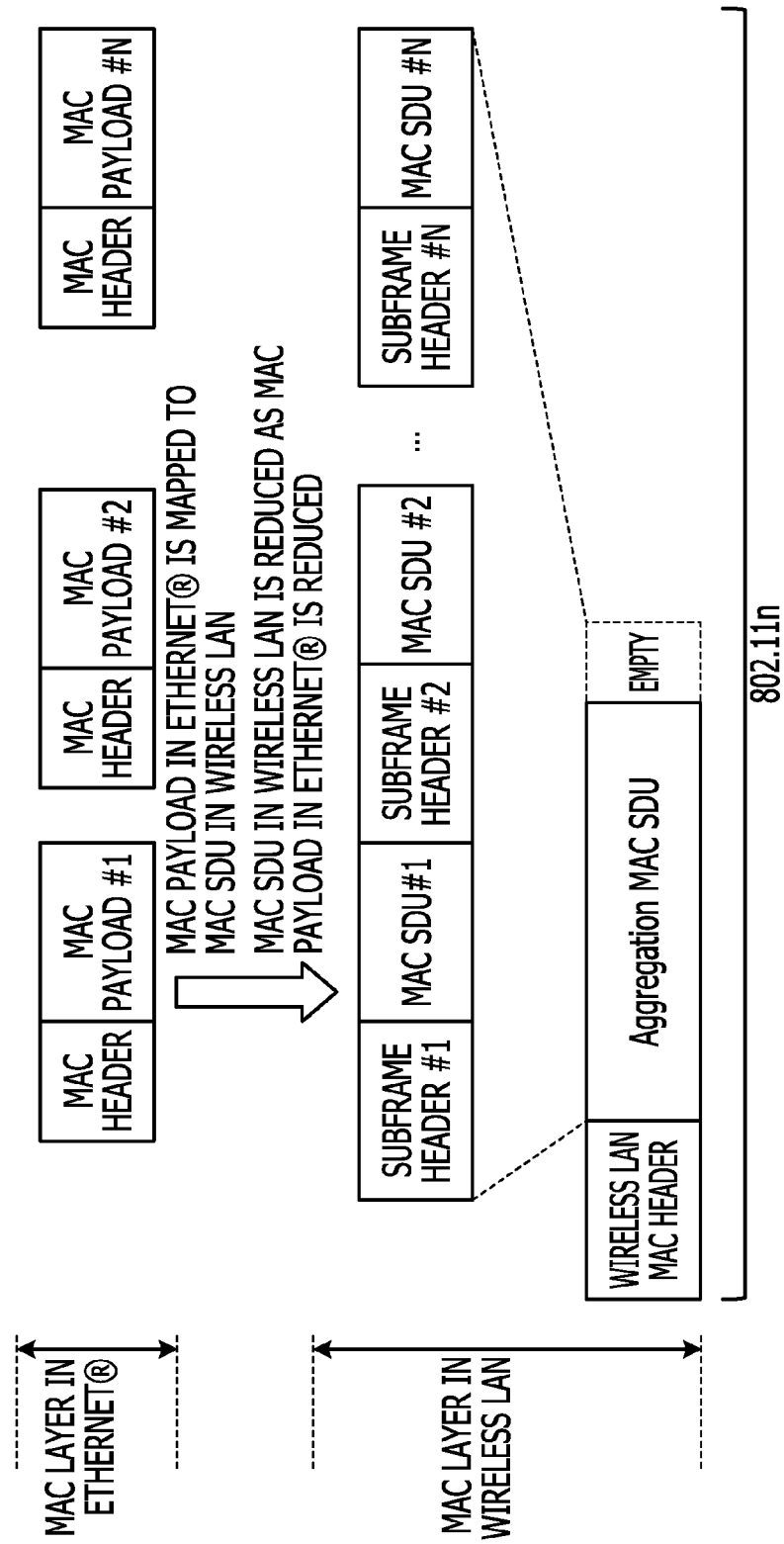
FIG. 4 is a diagram used to explain aggregation.

The base station 200 executes the aggregation processing using the retransmission packet that is transmitted from the communication device 50 (Step S48). For example, the base station 200 deletes data that is included in a success range indicated by a non-changed response in a TCP payload that is included in the retransmission packet, and forms a TCP payload in which the TCP payload after the aggregation is set as a unit, using data outside the success range indicated by the non-changed response. That is, in the retransmission packet that is transmitted in FIG. 21F, data for which delivery confirmation has been already obtained is also included. Therefore, out of data included in retransmission packets to which sequence numbers of 5500 and 6000 are assigned, data of sequence numbers of 5500 to 5749 is deleted, and a TCP payload is formed using the remaining data of 750 bytes (see FIG. 2G).

The base station 200 transmits the changed retransmission packet to the terminal 250 (Step S49).

<Uplink Flow>

Figure 22:
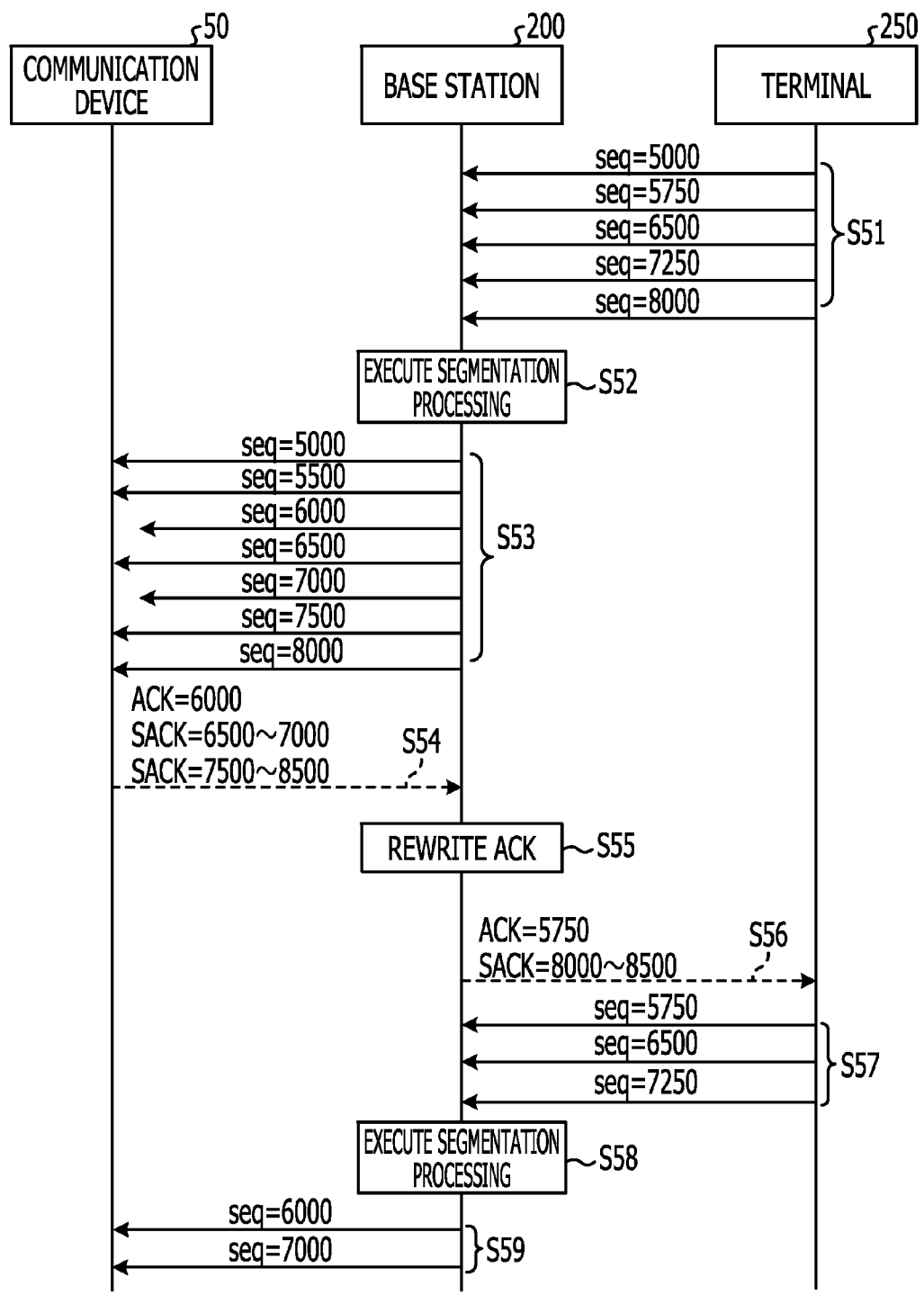
FIG. 22 is a sequence diagram used to explain processing operations of the communication device, the base station, and the terminal in the uplink flow.

FIG. 22 is a sequence diagram used to explain processing operations of the communication device, the base station, and the terminal in the uplink flow. FIGS. 23A to 23G are diagrams used to explain the processing operations of the communication device, the base station, and the terminal in the uplink flow. In each of FIGS. 23A to 23G, the status of a packet the transmission or reception of which is performed in the communication device, the base station, or the terminal and processing contents in the communication device, the base station, or the terminal are illustrated.

The terminal 250 transmits a series of packets that are destined for the communication device 50, to the base station 200 (Step S51). Here, five packets are transmitted to the base station 200. In FIG. 23A, the five packets are schematically illustrated. As illustrated in FIG. 23A, in a TCP payload of a packet to be transmitted from the terminal 250, 750 bytes are set as a unit.

The construction control unit 212 of the base station 200 controls the segmentation processing (Step S52). The unit of a TCP payload in such segmentation processing is 500 byte. As a result of such segmentation processing, the five packets become seven packets. In FIG. 23B, the packets that are obtained by the segmentation processing in the base station 200 are schematically illustrated.

The construction control unit 212 transmits the seven packets that are obtained by the segmentation processing, to the communication device 50 (Step S53). Here, as illustrated in FIG. 23C, it is assumed that two packets that correspond to sequence numbers of 6000 and 7000 have been lost.

The communication device 50 transmits a delivery confirmation response to the base station 200 (Step S54). The processing described herein is basically the same as the processing in Step S44.

In the base station 200, the retransmission control unit 211 rewrites the sequence numbers of the delivery confirmation response that is received from the communication device 50 (Step S55). For example, the retransmission control unit 211 rewrites success range information included in the received delivery confirmation response to a unit of a TCP payload that is transmitted by the terminal 250. That is, the processing described herein is basically the same as the processing in Step S45. Here, in FIG. 23D, the SACK of the sequence numbers of 6500 to 7000 indicates that successful reception of part of data that is included in the packet to which the sequence number of 6500 is assigned when the SACK of the sequence numbers of 6500 to 7000 is read as a unit of a TCP payload in the terminal 250. Therefore, the retransmission control unit 211 deletes the SACK of the sequence numbers of 6500 to 7000 (see FIG. 23E). That is, the sequence number of the SACK is rewritten so as to correspond to a boundary between TCP payloads before the segmentation, which is more than or equal to the minimum value of a success range that is indicated by the SACK and the closest to the sequence number, and a boundary between TCP payloads before the segmentation, which is less than or equal to the maximum value of the success range that is indicated by the SACK and the closest to the sequence number. In addition, the sequence number of the ACK is changed so as to correspond to a boundary between TCP payloads before the segmentation, which is less than or equal to the sequence number and the closest to the sequence number.

The base station 200 transmits the changed response to the terminal 250 (Step S56).

The terminal 250 identifies a failure range on the basis of the changed response that is received from the base station 200 and retransmits a packet that corresponds to the failure range (Step S57). In FIG. 23F, the retransmission packets at that time are schematically illustrated.

The base station 200 executes the segmentation processing using the retransmission packet that is transmitted from the terminal 250 (Step S58). For example, the base station 200 deletes data that is included in a success range indicated by a non-changed response in a TCP payload that is included in the retransmission packet, and forms a TCP payload in which the TCP payload after segmentation is set as a unit, using data outside the success range indicated by the non-changed response. That is, in the retransmission packet that is transmitted in FIG. 23F, data for which delivery confirmation has been already obtained is also included. Therefore, out of data included in retransmission packets to which the sequence numbers of 5750, 6500, and 7250 are assigned, data of the following sequence numbers is deleted, and a TCP payload in a unit of 500 bytes is formed using the remaining data (see FIG. 23G). The deleted data is data of sequence numbers 5750 to 5999, data of 6500 to 6999, and data of 7500 to 7999.

The base station 200 transmits the changed retransmission packet to the communication device 50 (Step S59).

As described above, in the third embodiment, in the base station 200, the retransmission control unit 201 receives a delivery confirmation response in response to a packet that is transmitted from the terminal 250 and includes a MAC payload including the aggregated TCP payloads. In the delivery confirmation response, information on a range of data included in the packets that are continuously received in the terminal 250 successfully is included. The retransmission control unit 201 changes the delivery confirmation response by rewriting the range to a unit of a TCP payload included in each of the plurality of packets that are received from the communication device 50. The wired LAN interface 11 transmits the changed delivery confirmation response to the communication device 50.

Therefore, even when the communication device 50 is a communication device that merely performs retransmission using a TCP payload included in a packet by the communication device, as a unit, the packet retransmission may be realized.

In addition, in the base station 200, the retransmission control unit 211 receives a delivery confirmation response for a packet that is transmitted from the communication device 50 and includes a MAC payload including the segmented and redistributed TCP payloads. In the delivery confirmation response, information on a range of data that is included in the packets continuously received in the communication device 50 successfully is included. The retransmission control unit 211 changes the delivery confirmation response by rewriting the range to a unit of TCP payloads that are included in the plurality of packets received from the terminal 250. The wireless LAN interface 18 transmits the changed delivery confirmation response to the terminal 250.

Therefore, even when the terminal 250 is a communication device that merely performs retransmission using a TCP payload included in a packet by the communication device, as a unit, the packet retransmission may be realized.

Fourth Embodiment

Similar to the third embodiment, a fourth embodiment is related to retransmission control of a packet that is transmitted from a communication device to a terminal by a base station, and retransmission control of a packet that is transmitted from the terminal to the communication device by the base station. However, different from the third embodiment, in the fourth embodiment, the base station executes retransmission processing merely in a certain time period or by a certain number of times using a packet on which the base station performs buffering and thereafter executes processing that is similar to the processing in the third embodiment. The terminal and the communication device according to the fourth embodiment are similar to the terminal and the communication device according to the third embodiment.

[Configuration of a Base Station]

Figure 24:
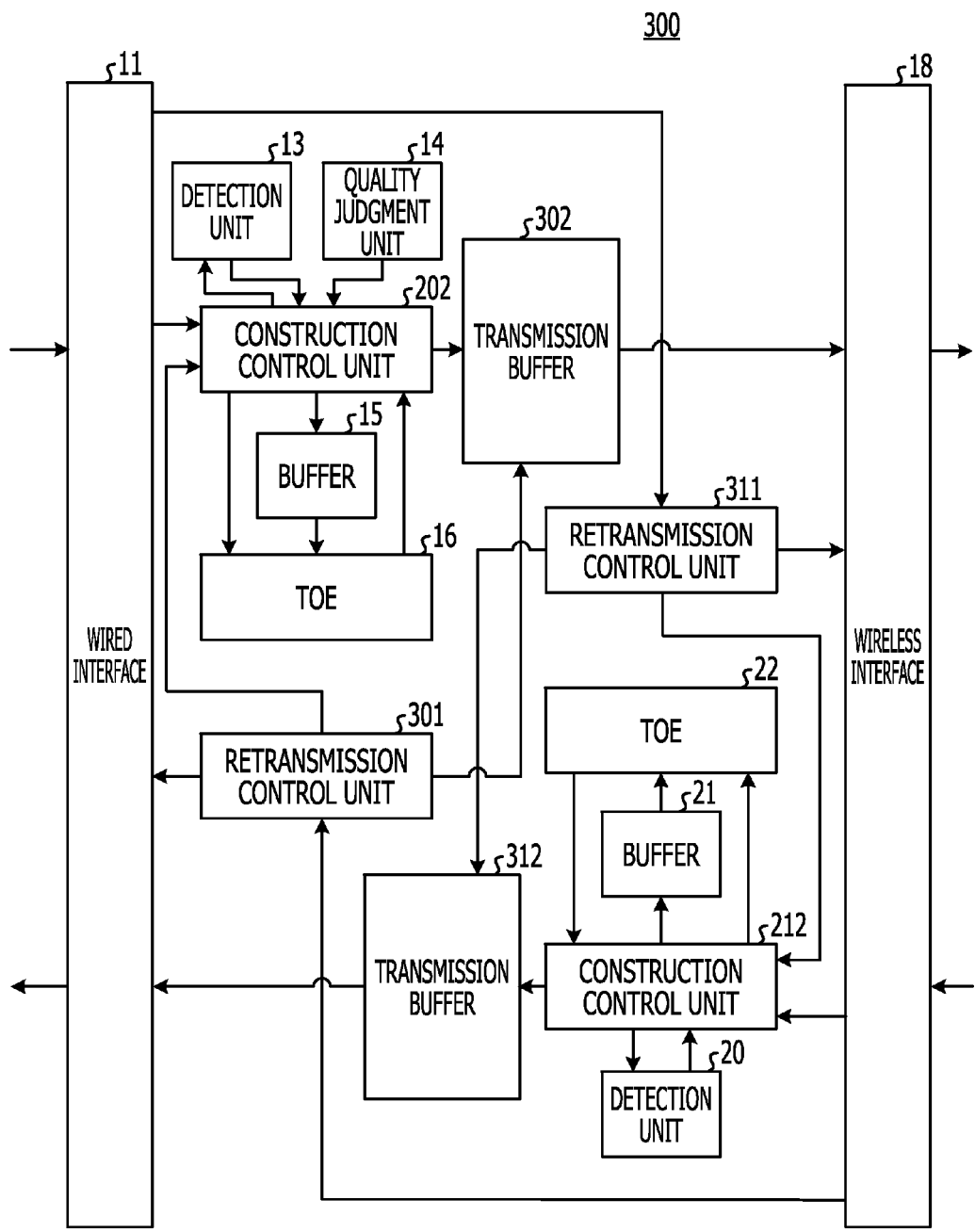
FIG. 24 is a block diagram illustrating an example of a base station according to a fourth embodiment.

FIG. 24 is a block diagram illustrating an example of a base station according to a fourth embodiment. In FIG. 24, a base station 300 includes retransmission control units 301 and 311, and transmission buffers 302 and 312.

The retransmission control unit 301 includes a function that is similar to the retransmission control unit 201 according to the third embodiment.

In addition, for a packet that is transmitted from the communication device 50 to the terminal 250, the retransmission control unit 301 executes retransmission control that is initiated by the base station 300 prior to the retransmission control in the third embodiment.

For example, the retransmission control unit 301 receives a delivery confirmation response that is transmitted from the terminal 250 through the wireless interface 18, and identifies a failure range that is not included in a success range indicated by the delivery confirmation response, on the basis of the delivery confirmation response. In addition, the retransmission control unit 301 outputs a retransmission instruction of a packet that corresponds to the failure range to the transmission buffer 302. The retransmission control is repeated in a certain time period or by a certain number of times. After that, the retransmission control unit 301 executes retransmission control that is similar to the retransmission control unit 201 according to the third embodiment. The retransmission control unit 301 outputs a deletion instruction of a packet that corresponds to the success range indicated by the delivery confirmation response that is transmitted from the terminal 250, to the transmission buffer 302.

The transmission buffer 302 stores a packet. In addition, when the transmission buffer 302 receives the retransmission instruction from the retransmission control unit 301, the transmission buffer 302 transmits a packet that is indicated by the retransmission instruction, to the terminal 250 through the wireless interface 18. In addition, when the transmission buffer 302 receives the deletion instruction from the retransmission control unit 301, the transmission buffer 302 deletes a packet that is indicated by the deletion instruction.

The retransmission control unit 311 includes a function that is similar to the retransmission control unit 211 according to the third embodiment.

In addition, for a packet transmitted from the terminal 250 to the communication device 50, the retransmission control unit 311 executes retransmission control initiated by the base station 300 prior to the retransmission control in the third embodiment.

For example, the retransmission control unit 311 receives the delivery confirmation response that is transmitted from the communication device 50 through the wired interface 11, and identifies a failure range that is not included in a success range indicated by the delivery confirmation response, on the basis of the delivery confirmation response. In addition, the retransmission control unit 311 outputs a retransmission instruction of a packet that corresponds to the failure range, to the transmission buffer 312. The retransmission control is repeated in a certain time period or by a certain number of times. After that, the retransmission control unit 311 executes retransmission control that is similar to the retransmission control in the retransmission control unit 211 in the third embodiment. The retransmission control unit 311 outputs a deletion instruction of a packet that corresponds to the success range indicated by the delivery confirmation response transmitted from the communication device 50, to the transmission buffer 312.

The transmission buffer 312 stores a packet. In addition, when the transmission buffer 312 receives the retransmission instruction from the retransmission control unit 311, the transmission buffer 312 transmits a packet indicated by the retransmission instruction, to the communication device 50 through the wired interface 11. In addition, when the transmission buffer 312 receives the deletion instruction from the retransmission control unit 311, the transmission buffer 312 deletes a packet indicated by the deletion instruction.

[Operation of the Base Station]

Processing operations of the base station that includes the above-described configuration are described below. Hereinafter, a processing operation of the base station 300 in the downlink flow and a processing operation of the base station 300 in the uplink flow are described separately.

<Downlink Flow>

Figure 25:
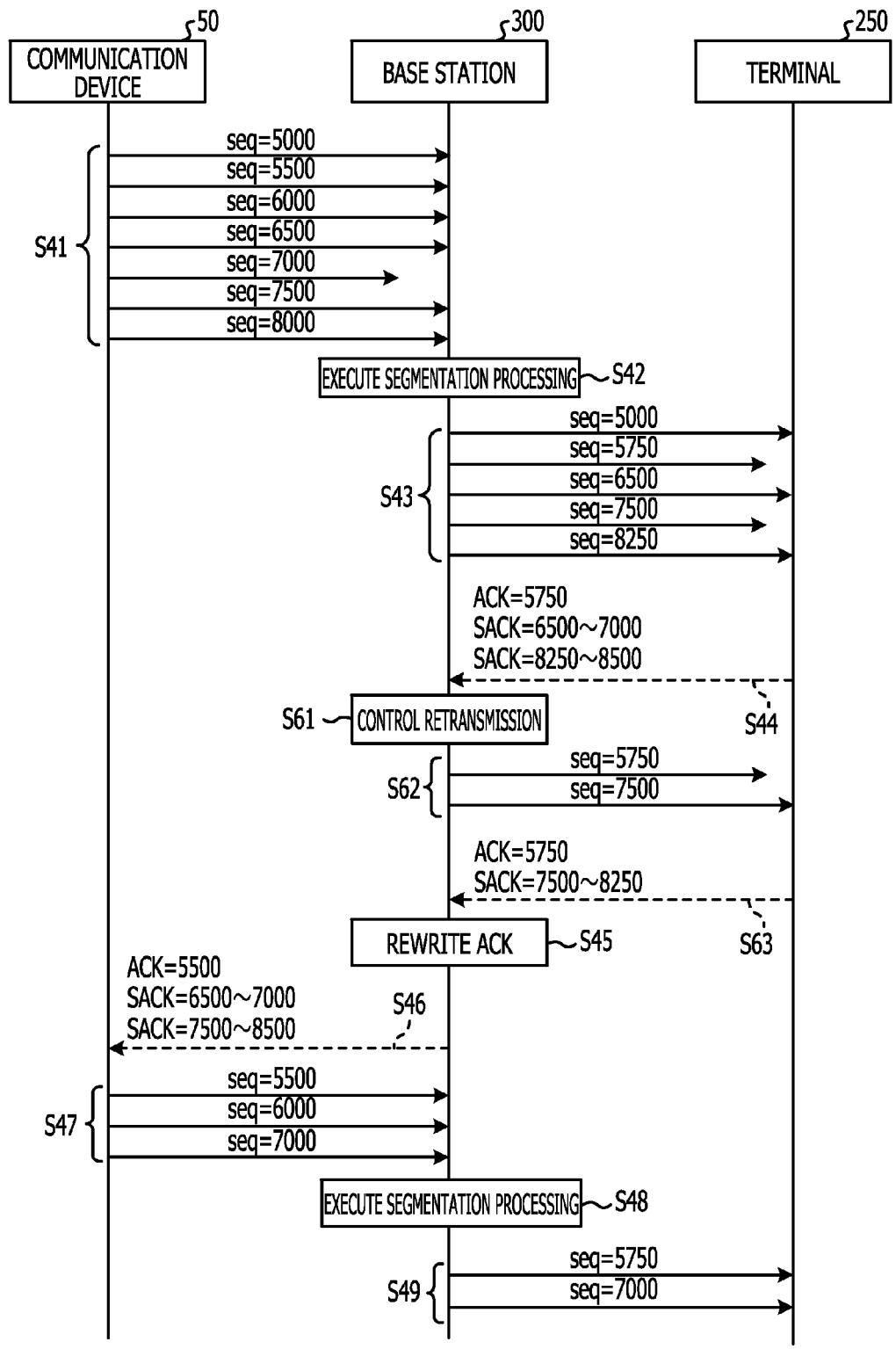
FIG. 25 is a sequence diagram used to explain processing operations of the communication device, the base station, and the terminal in the downlink flow.

FIG. 25 is a sequence diagram used to explain processing operations of the communication device, the base station, and the terminal in the downlink flow. FIGS. 26A to 26K are diagrams used to explain the processing operations of the communication device, the base station, and the terminal in the downlink flow. In each of FIGS. 26A to 26K, the status of a packet the transmission or reception of which is performed in the communication device, the base station, or the terminal and processing contents in the communication device, the base station, or the terminal are illustrated.

Figure 26:
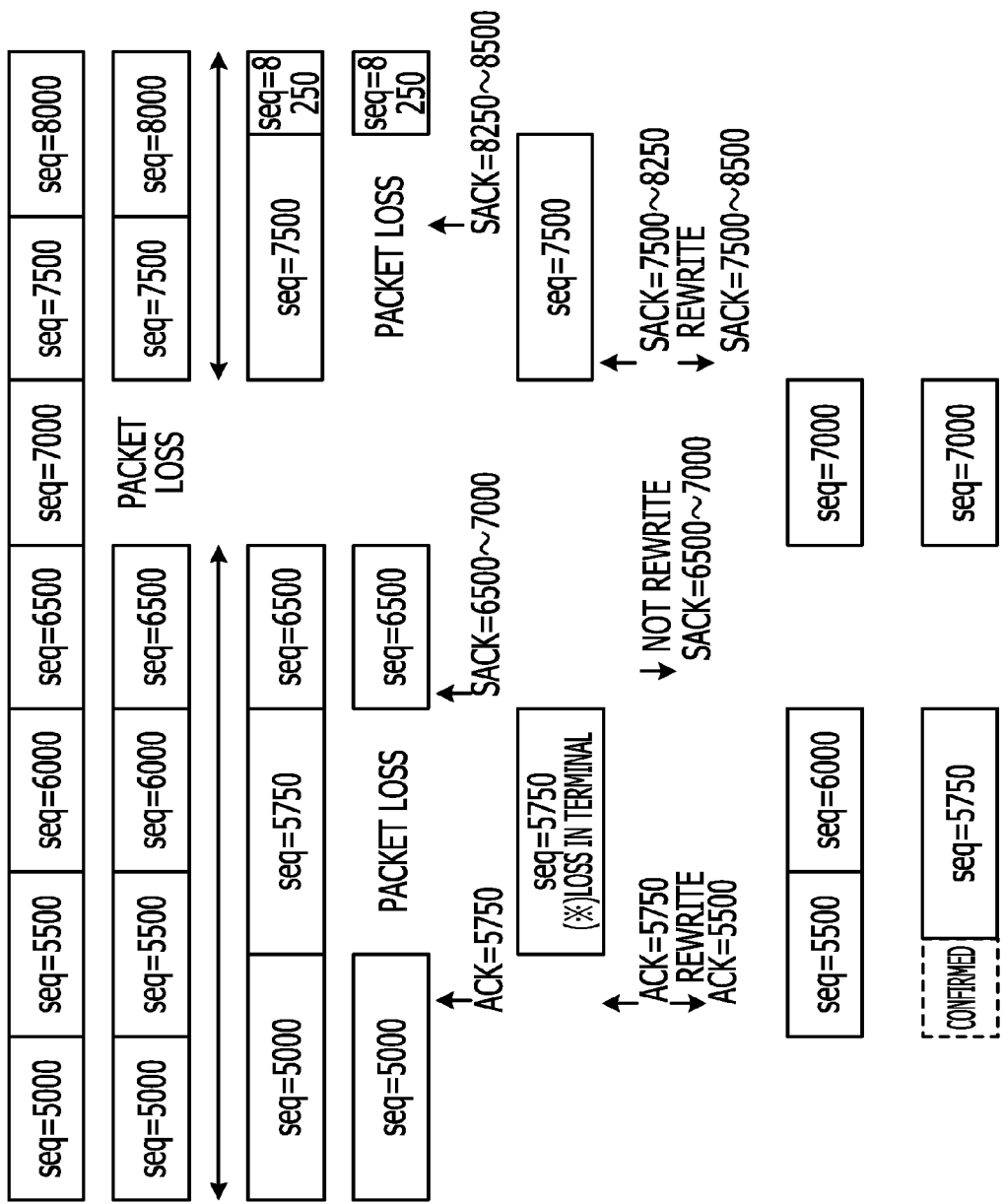
FIGS. 26A to 26K are diagrams used to explain the processing operations of the communication device, the base station, and the terminal in the downlink flow.

A processing operation in Steps S41 to S49 of FIG. 25 is basically the same as the processing operation in FIG. 20. However, as illustrated in FIG. 26B, the packet which is transmitted from the communication device 50 and to which the sequence number of 7000 is assigned has been lost. Thus, as illustrated in FIG. 26D, data included in the lost packet is not transmitted to the terminal 250 at the initial stage. In addition, as illustrated in FIG. 26C, the packet that is configured by the aggregation processing is stored in the transmission buffer 302 until a deletion instruction is issued. In addition, as illustrated in FIG. 26E, out of the packets transmitted from the base station 300 to the terminal 250, the two packets to which the sequence numbers of 5750 and 7500 are assigned have been lost.

In the base station 300, the retransmission control unit 301 receives a delivery confirmation response transmitted from the terminal 250 through the wireless interface 18 and executes the retransmission control initiated by the base station 300 (Step S61). For example, the retransmission control unit 301 receives the delivery confirmation response transmitted from the terminal 250 through the wireless interface 18 and identifies a failure range that is not included in a success range indicated by the delivery confirmation response, on the basis of the delivery confirmation response. In addition, the retransmission control unit 301 outputs a retransmission instruction of a packet that corresponds to the failure range, to the transmission buffer 302.

The transmission buffer 302 transmits a retransmission packet to the terminal 250 in response to the retransmission instruction (Step S62). Here, as illustrated in FIG. 26G, it is assumed the retransmission packet to which the sequence number of 5750 is assigned has been lost.

The terminal 250 transmits the delivery confirmation response to the base station 300 (Step S63). Here, the processing in Steps S61 to S63 is repeated in a certain time period or by a certain number of times.

In the base station 300, the retransmission control unit 301 rewrites the sequence number of the delivery confirmation response that is received from the terminal 250 (Step S45). Here, as illustrated in FIG. 26I, the SACK of the sequence numbers of 6500 to 7000, which is received from the terminal 250 at the time illustrated in FIG. 26F is set in a unit a TCP payload of the communication device 50, so that the SACK of the sequence numbers of 6500 to 7000 is set as changed SACK without changing.

<Uplink Flow>

Figure 27:
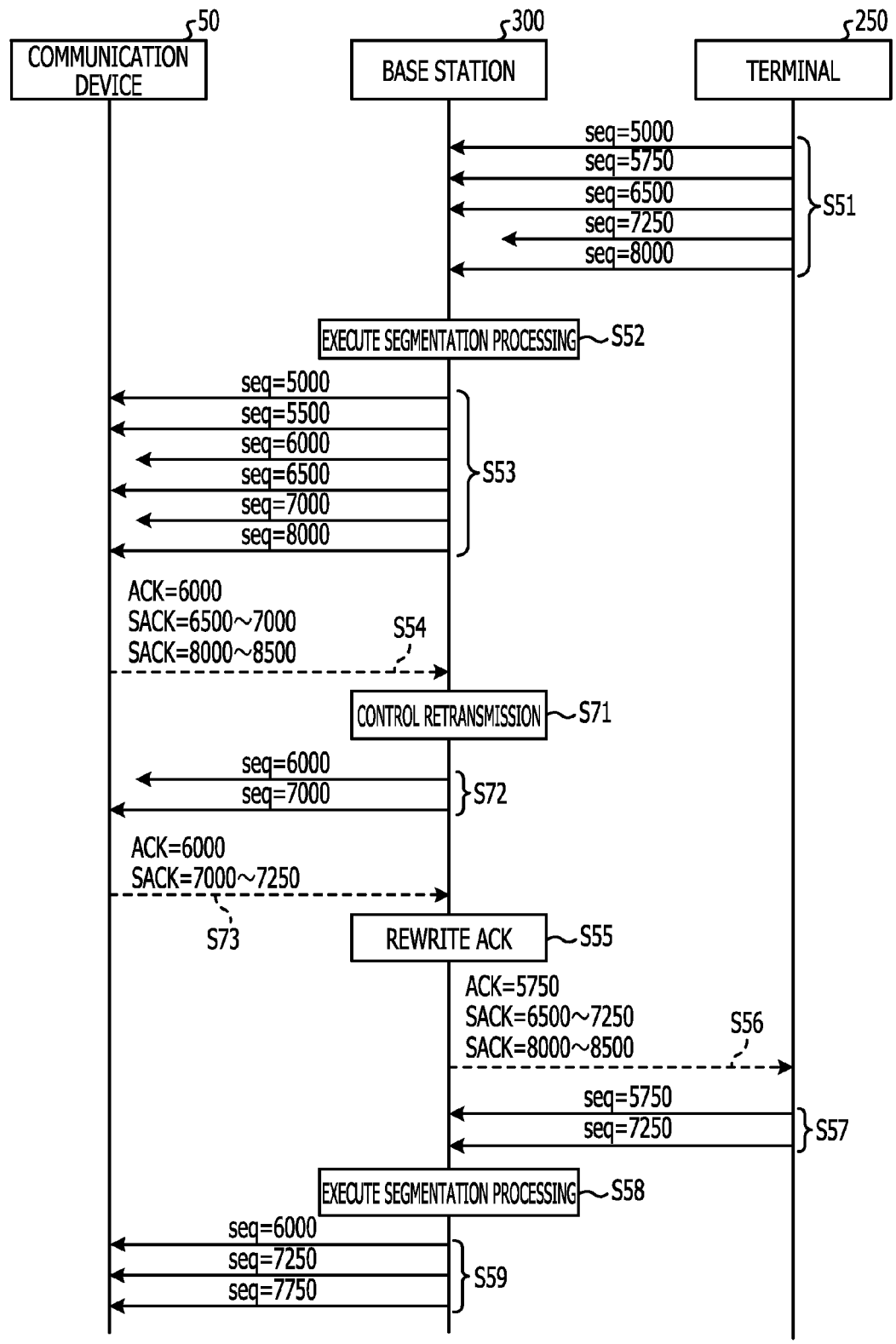
FIG. 27 is a sequence diagram used to explain processing operations of the communication device, the base station, and the terminal in the uplink flow.
Figure 28:
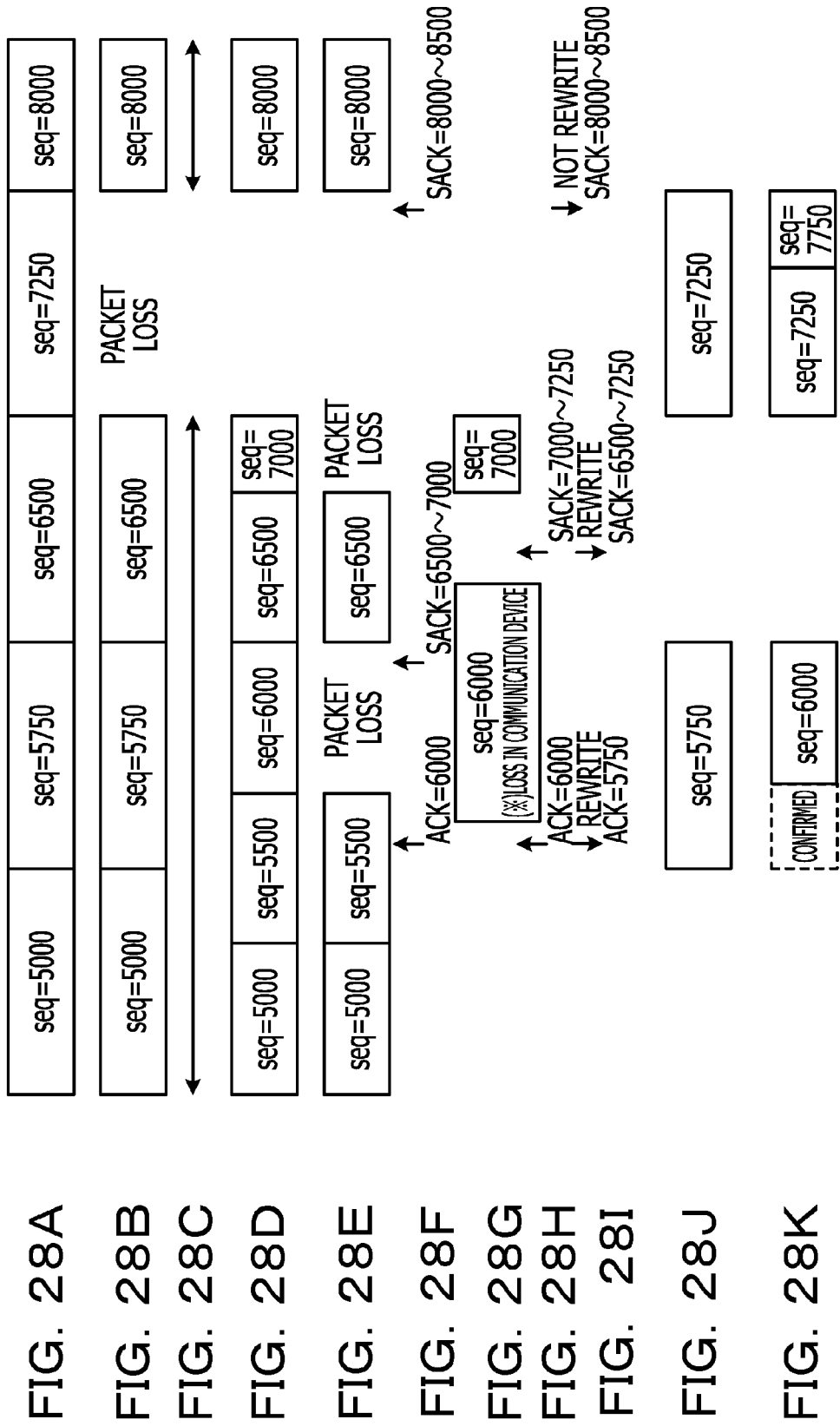
FIGS. 28A and 28K are diagrams used to explain the processing operations of the communication device, the base station, and the terminal in the uplink flow.

FIG. 27 is a sequence diagram used to explain processing operations of the communication device, the base station, and the terminal in the uplink flow. FIGS. 28A and 28K are diagrams used to explain the processing operations of the communication device, the base station, and the terminal in the uplink flow. In each of FIGS. 28A to 28K, the status of a packet the transmission or reception of which is performed in the communication device, the base station, or the terminal and processing contents in the communication device, the base station, or the terminal are illustrated.

A processing operation in Steps S51 to S59 of FIG. 27 is basically the same as the processing operation in FIG. 22. However, as illustrated in FIG. 28B, the packet which is transmitted from the terminal 250 and to which the sequence number of 7250 is assigned has been lost. Thus, as illustrated in FIG. 28D, data included in the lost packet is not transmitted to the communication device 50 at the initial stage. In addition, as illustrated in FIG. 28C, the packet that is configured by the segmentation processing is stored in the transmission buffer 312 until a deletion instruction issued. In addition, as illustrated in FIG. 28E, out of the packets transmitted from the base station 300 to the communication device 50, the two packets to which the sequence numbers of 6000 and 7000 are assigned have been lost.

In the base station 300, the retransmission control unit 311 receives a delivery confirmation response transmitted from the communication device 50 through the wired interface 11, and executes the retransmission control initialized by the base station 300 (Step S71). For example, the retransmission control unit 311 receives the delivery confirmation response transmitted from the communication device 50 through the wired interface 11 and identifies a failure range that is not included in a success range indicated by the delivery confirmation response, on the basis of the delivery confirmation response. In addition, the retransmission control unit 311 outputs a retransmission instruction of a packet that corresponds to the failure range, to the transmission buffer 312.

The transmission buffer 312 transmits a retransmission packet to the communication device 50 in response to the retransmission instruction (Step S72). Here, as illustrated in FIG. 28G, it is assumed that the retransmission packet to which the sequence number of 6000 is assigned has been lost.

The communication device 50 transmits the delivery confirmation response to the base station 300 (Step S73). Here, the processing in Steps S71 to S73 is repeated in a certain time period or by a certain number of times.

In the base station 300, the retransmission control unit 311 rewrites the sequence number of the delivery confirmation response that is received from the communication device 50 (Step S55). Here, as illustrated in FIG. 28I, the SACK of the sequence numbers of 8000 to 8500, which is received from the communication device 50 at the time illustrated in FIG. 28F is set in a unit of a TCP payload of the terminal 250, so that the SACK of the sequence numbers of 8000 to 8500 is set as changed SACK without changing.

As described above, in the fourth embodiment, the retransmission control unit 301 controls retransmission of a packet stored in the transmission buffer 302, on the basis of the delivery confirmation response transmitted from the terminal 250, by a certain number of times or in a certain time period, and causes the wired interface 11 to transmit the changed delivery confirmation response.

Therefore, for a packet that the base station 300 receives, out of the plurality of packets transmitted from the communication device 50, the base station 300 performs retransmission without returning a delivery confirmation response to the communication device 50, so that processing load associated with ACK change processing of the base station 300 may be reduced and the packet may be retransmitted efficiently. In addition, a retransmission request may be issued to the communication device 50 merely for a packet that is not successfully received in the terminal 250 even in the retransmission initialized by the base station 300, so that a signaling amount in the wired LAN may be reduced.

The retransmission control unit 311 controls retransmission of a packet stored in the transmission buffer 312, on the basis of the delivery confirmation response transmitted from the communication device 50, by a certain number of times or in a certain time period and causes the wireless interface 18 to transmit the changed delivery confirmation response.

Therefore, for a packet that the base station 300 receives, out of the plurality of packets transmitted from the terminal 250, the base station 300 performs retransmission without returning a delivery confirmation response to the terminal 250, so that processing load associated with ACK change processing of the base station 300 may be reduced and the packet may be retransmitted efficiently. In addition, a retransmission request may be issued to the terminal 250 merely for a packet that is not successfully received in the communication device 50 even in the retransmission initialized by the base station 300, so that a signaling amount in the wireless LAN may be reduced.

Fifth Embodiment

In a fifth embodiment, a base station receives the maximum segment size (MSS) of a TCP from a communication device, changes the received MSS to a size that corresponds to the maximum length of a MAC SDU in a transmission interface, and transmits the changed MSS to the terminal. Here, generally, the MSS of the communication device is set on the basis of the maximum length of the MAC SDU in the transmission interface, so that the MSS corresponds to the maximum length of the MAC SDU. However, the MSS may be set small by a designer. In addition, practically, it is probable that there exists a terminal that forms a TCP payload in accordance with the MSS received from the communication device. In the fifth embodiment, even in such a case, a technology is realized that avoids reduction in the transmission efficiency between the base station and the terminal. The configurations of the base station and the terminal according to the fifth embodiment are basically the same as the configurations of the base station and the terminal according to the first embodiment, and the description is made using FIGS. 8 and 9, for example.

In the base station 10 according to the fifth embodiment, the construction control unit 12 receives the MSS of the communication device 50 from the communication device 50. In addition, the construction control unit 12 changes the received MSS to a size that corresponds to the maximum length of a MAC SDU in the wireless LAN and transmits the changed MSS to the terminal 30. In addition, the construction control unit 19 sets the maximum length of the MAC SDU in the wired interface 11 on the basis of the MSS of the communication device 50.

In the terminal 30 according to the fifth embodiment, the construction control unit 31 controls a TCP payload having a length that corresponds to the changed MSS received from the base station 10, to be formed.

Here, when the change processing of the MSS is not executed by the base station 10, the terminal 30 receives the MSS that is set small and is transmitted from the communication device 50, so that a TCP payload the size of which is small is formed in accordance with the received MSS. Therefore, when the base station 10 changes the MSS, the terminal 30 may form a TCP payload the size of which corresponds to the maximum length of the MAC SDU in the wireless LAN. As a result, the transmission efficiency between the base station 10 and the terminal 30 in the wireless LAN may be improved.

Figure 29:
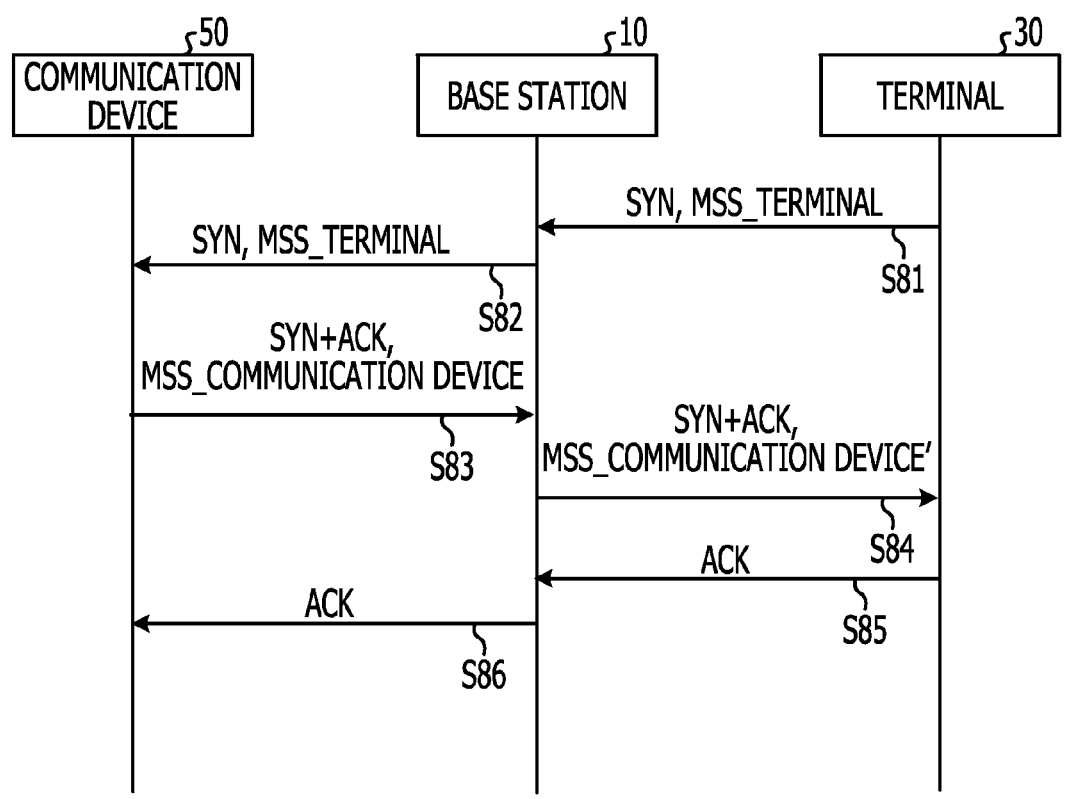
FIG. 29 is a sequence diagram illustrating flow establishment of TCP in a fifth embodiment.

FIG. 29 is a sequence diagram illustrating flow establishment of TCP in the fifth embodiment. Generally, the TCP flow is established between the terminal 30 and the communication device 50 by a procedure that is called "3-way handshake". In the "3-way handshake", a SYN packet, a SYN+ACK packet, and an ACK packet are transmitted. At that time, the MSS is exchanged between the terminal 30 and the communication device 50.

The terminal 30 transmits a SYN packet that includes "MSS_terminal" that is an MSS value of the terminal 30, to the base station 10 (Step S81). The "MSS_terminal" is set at a size that corresponds to the maximum length of the MAC SDU in the wireless LAN.

The base station 10 transmits the SYN packet received from the terminal 30, to the communication device 50 (Step S82).

The communication device 50 transmits a SYN+ACK packet that includes "MSS_communication device" that is a MSS value of the communication device 50, to the base station 10 (Step S83). Here, it is assumed that the "MSS_communication device" is set smaller than the maximum length of the TCP payload in the wired LAN.

When the base station 10 receives the SYN+ACK packet that includes the "MSS_communication device", the base station 10 changes the received MSS to a size that corresponds to the maximum length of the MAC SDU in the wireless LAN, and transmits the changed MSS, that is, "MSS_communication device", to the terminal 30 (Step S84).

The terminal 30 transmits ACK to the base station 10 (Step S85). The base station 10 transmits the received ACK to the communication device 50 (Step S86).

Here, a packet transmitted from the terminal 30 to the communication device 50 is segmented into a size that corresponds to the "MSS_communication device" in the base station 10, and is transmitted to the communication device 50.

Other Embodiments

[1] In the first embodiment to the fifth embodiment, for convenience of description, as configuration elements of the base station, the construction control unit, the TOE, the buffer, the transmission buffer, and the detection unit are provided in each of the uplink and the downlink. However, the embodiments are not limited to such a configuration, and alternatively, a single function unit may be shared in the uplink and the downlink. For example, in the base station 10, the construction control unit 12 and the construction control unit 19 may be realized by a single function unit.

[2] The base station and the terminal according to the first embodiment to the fifth embodiment may be realized by the following hardware configuration.

Figure 30:
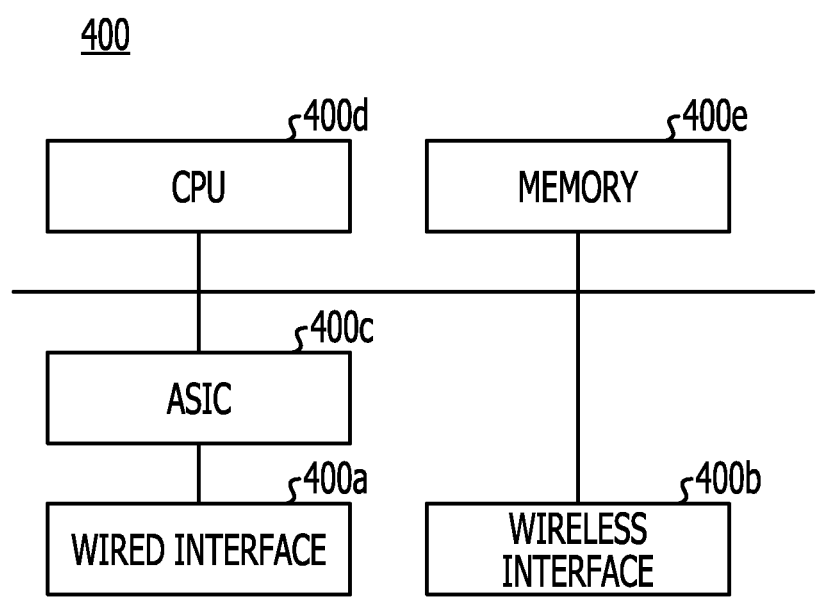
FIG. 30 is a diagram illustrating a hardware configuration of the base station.

FIG. 30 is a diagram illustrating a hardware configuration of the base station. As illustrated in FIG. 30, a base station 400 includes a wired interface 400*a*, a wireless interface 400*b*, an application specific integrated circuit (ASIC) 400*c*, a central processing unit (CPU) 400*d*, and a memory 400*e*, as configuration elements of hardware. The wired interface 400*a*, the wireless interface 400*b*, the ASIC 400*c*, the CPU 400*d*, and the memory 400*e* are connected to each other through a bus. The wireless interface 400*b* includes an antenna. The memory 400*e* is constituted, for example, by a random access memory (RAM) such as a synchronous dynamic RAM (SDRAM), a read only memory (ROM), or a flash memory.

When the base station 400 corresponds to the base station 10, the construction control units 12 and 19, the detection units 13 and 20, and the quality judgment unit 14 are realized by the CPU 400*d*. In addition, the TOE 16 and 22 are realized by the ASIC 400*c*. In addition, the buffers 15 and 21, and the transmission buffers 17 and 23 are realized by the memory 400*e*. In addition, the wired interface 11 corresponds to the wired interface 400a, and the wireless interface 18 corresponds to the wireless interface 400b.

In addition, when the base station 400 corresponds to the base station 100, the control signal generation unit 101 is realized by the CPU 400d.

In addition, when the base station 400 corresponds to the base station 200, the retransmission control units 201 and 211 are realized by the CPU 400d.

In addition, when the base station 400 corresponds to the base station 300, the retransmission control units 301 and 311 are realized by the CPU 400d. In addition, the transmission buffers 302 and 312 are realized by the memory 400e.

Figure 31:
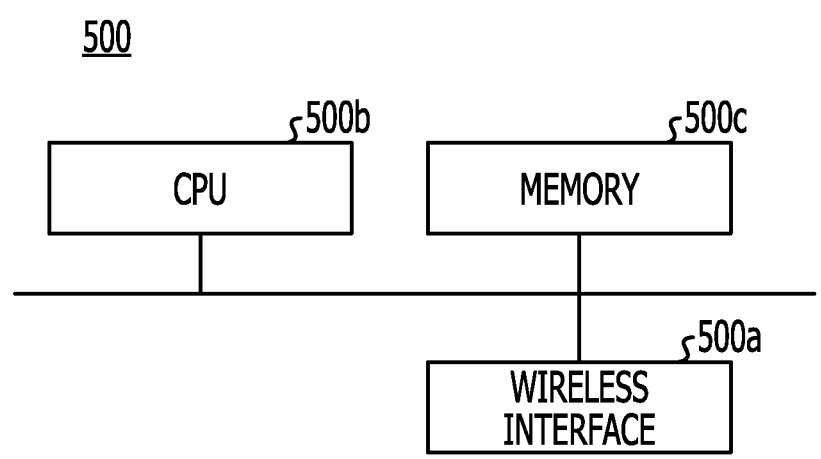
FIG. 31 is a diagram illustrating a hardware configuration of the terminal.

FIG. 31 is a diagram illustrating a hardware configuration of the terminal. As illustrated in FIG. 31, a terminal 500 includes a wireless interface 500a, a CPU 500b, and a memory 500c, as configuration elements of hardware. The memory 500c is constituted by, for example, a RAM such as SDRAM, a ROM, or a flash memory. The wireless interface 500a includes an antenna.

When the terminal 500 corresponds to the terminal 30, the construction control unit 31, the detection unit 32, the quality judgment unit 33, and the reception processing unit 35 are realized by the CPU 500b. The wireless interface 34 corresponds to the wireless interface 500a.

In addition, when the terminal 500 corresponds to the terminal 150, the reception processing unit 151 and the detection unit 152 are realized by the CPU 500b.

In addition, when the terminal 500 corresponds to the terminal 250, the reception processing unit 251, the retransmission control unit 252, and the construction control unit 253 are realized by the CPU 500b.

In addition, the various pieces of processing that are described in the first embodiment to the fifth embodiment may be realized by executing a program, which is prepared beforehand, in a computer. That is, a program that corresponds to each of the pieces of processing that are executed by the construction control units 12 and 19, the detection units 13 and 20, the quality judgment unit 14, the control signal generation unit 101, the retransmission control units 201 and 211, and the retransmission control units 301 and 311 may be recorded in the memory 400e and may be read by the CPU 400d to function as a process. In addition, the program that corresponds to each of the pieces of processing that are executed by the construction control unit 31, the detection unit 32, the quality judgment unit 33, the reception processing unit 35, the reception processing unit 151, the detection unit 152, the reception processing unit 251, the retransmission control unit 252, and the construction control unit 253 may be recorded in the memory 500c and may be read by the CPU 500b to function as a process.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless base station comprising:
a receiver that receives a plurality of packets through a wired network, the plurality of packets including address information indicating a final destination of the plurality of packets;
a processor configured to:
detect, based on the address information, whether a first communication device identified by the address information as the final destination is a wireless communication device,
detect, based on the address information, whether the first communication device identified by the address information as the final destination is a wired communication device to which the plurality of packets are to be transmitted from the wireless base station via a first next-hop device, and
aggregate the plurality of packets to form an aggregated packet, when the first communication device is detected to be the wireless communication device; and
a first transmitter which communicates with another device using the wireless network, and configured to
transmit, through the wireless network, the aggregated packet to a second next-hop device when the first communication device is the wireless communication device, and
transmit, through the wireless network, the plurality of packets individually to the first next-hop device which relays between the wireless base station and the first communication device when the first communication device is the wired communication device.

2. The wireless base station according to claim 1,
wherein the processor is configured to judge whether a value indicating quality of a communication path between the wireless base station and the second next-hop device is a threshold value or more, and
wherein the aggregated packet is formed when the first communication device is the wireless communication device and the value indicating quality of the communication path is the threshold value or more.

3. The wireless base station according to claim 1, further comprising:
a memory that stores a physical address that is used to identify a device that is connected to the wireless base station through the wireless network, and
wherein the processor is configured to judge that the first communication device is the wireless communication device when physical addresses designated by the address information included in the plurality of packets as the final destination are identified to the physical address stored in the memory.

4. The wireless base station according to claim 1,
wherein the processor is configured to:
receive a delivery confirmation response that is a response for the aggregated packet including a first payload and is transmitted from the wireless communication device that is the first communication device, the delivery confirmation response including information on a range of data that is included in packets continuously received in the wireless communication device successfully, and
change the delivery confirmation response by rewriting the range to a unit of a second payload, the second payload being included in the plurality of packets that are received through the wired network, and wherein the wireless base station further comprises a second transmitter that transmits the changed delivery confirmation response through the wired network.

5. The wireless base station according to claim 4, further comprising:
a transmission buffer that stores packets that are transmitted from the first transmitter,
wherein the processor is configured to cause the second transmitter to transmit the changed delivery confirmation response after controlling retransmission of the packets stored in the transmission buffer, based on the delivery confirmation response transmitted from the wireless communication device that is the first communication device, by a certain number of times or in a certain time period.

6. The wireless base station according to claim 4,
wherein the processor is configured to set a maximum length of the first payload, based on a maximum segment size of a transmission control protocol of a transport layer on a transmission-side device that transmits the plurality of packets through the wired network.

7. The wireless base station according to claim 1,
wherein the processor is configured to:
receive a signal that includes a maximum segment size of a transmission control protocol of a transport layer on a transmission-side device that transmits the plurality of packets through the wired network,
change the maximum segment size to a size that correspond to the maximum length, and
transmit the signal that includes the changed maximum segment size to the wireless communication device that is the first communication device.

8. A wireless base station comprising:
a receiver that receives an aggregated packet which includes a plurality of packets from a wireless terminal through a wireless network, the aggregated packet including address information indicating a final destination of the plurality of packets;
a processor configured to:
generate a signal indicating that the wireless base station has a function to receive the aggregated packet including a plurality of packets, and
divide the aggregated packet into the plurality of packets when the final destination designated by the address information is a wired communication device that is a communicating party of the wireless terminal through a wired network,
a first transmitter that transmits the plurality of packets to the wired communication device that is a communicating party of the wireless terminal, through the wired network; and
a second transmitter that transmits the signal to the wireless terminal device through the wireless network,
wherein the processor is further configured to
receive a delivery confirmation response that is a response for the aggregated packet including a first payload formed in accordance with the protocol of the data link layer and that is transmitted from the wired communication device, the delivery confirmation response including information on a range of data that is included in packets continuously received in the wired communication device successfully, and
change the delivery confirmation response by rewriting the range to a unit of a second payload in accordance with the transmission control protocol of the transport layer, each of the plurality of packets that are received through the wireless network including the second payload, and
wherein the second transmitter transmits the changed delivery confirmation response through the wireless network.

9. The wireless base station according to claim 8, further comprising:
a transmission buffer that stores packets transmitted from the first transmitter, and
wherein the processor is configured to cause the second transmitter to transmit the changed delivery confirmation response after controlling retransmission of the packets stored in the transmission buffer, based on the delivery confirmation response transmitted from the wired communication device, by a certain number of times or in a certain time period.

10. A packet transmission method using a wireless base station including a first receiver, a first processor and a first transmitter which communicates with another device using a wireless network, the method comprising:
receiving, by the first receiver, a plurality of packets through a wired network, the plurality of packets including address information indicating a final destination of the plurality of packets;
detecting, by the first processor, based on the address information, whether a communication device identified by the address information as the final destination is a wireless communication device;
detecting, by the first processor, based on the address information, whether the communication device identified by the address information as the final destination is a wired communication device to which the plurality of packets are to be transmitted from the wireless base station via a first next-hop device;
aggregating, by the first processor, the plurality of packets to form a first aggregated packet, when the communication device is detected to be the wireless communication device;
transmitting, by the first transmitter, through the wireless network, the first aggregated packet to a second next-hop device when the communication device is the wireless communication device; and
transmitting, by the first transmitter, through the wireless network, the plurality of packets individually to the first next-hop device which relays between the wireless base station and the communication device when the communication device is the wired communication device.

11. The packet transmission method according claim 10,
wherein the wireless terminal includes a second processor and a second transmitter, the packet transmission method further comprising:
detecting, by the second processor, whether the wireless base station includes a function to receive a second aggregated packet including a plurality of packets and to divide the second aggregated packet into the plurality of packets;
aggregating, by the second processor, the plurality of packets to form the second aggregated packet including the plurality of packets when the wireless base station is detected to include the function;
transmitting, by the second transmitter, the second aggregated packet to the wireless base station when the wireless base station is detected to include the function; and transmitting, by the second transmitter, the plurality of packets separately to the wireless base station when the wireless base station is not detected to include the function.

12. The packet transmission method according to claim 11 further comprising:

judging, by the second processor, whether a value indicating quality of a communication path between the wireless terminal and the wireless base station is a threshold value or more; and forming, by the second processor, the second aggregated packet when the wireless base station is detected to include the function and the value indicating quality of the communication path is the threshold value or more.

13. The packet transmission method according to claim 11, the wireless terminal further includes a memory that stores identification information that is used to identify the wireless base station that is a connection destination candidate and includes the function, the packet transmission method further comprising:

detecting, by the second processor, that the function is included in the wireless base station of the connection destination when the identification information that is used to identify the wireless base station of the connection destination is stored in the memory.

14. The packet transmission method according to claim 11, wherein the wireless terminal further includes a second receiver that receives a control signal that includes information indicating that the wireless base station of the connection destination includes the function, from the wireless base station of the connection destination, the packet transmission method further comprising:

detecting, by the second processor, that the wireless base station of the connection destination includes the function, based on the control signal.

* * * * *